US012051879B2

(12) United States Patent
Kamiya et al.

(10) Patent No.: US 12,051,879 B2
(45) Date of Patent: Jul. 30, 2024

(54) CONNECTION COMPONENT AND CONNECTION STRUCTURE

(71) Applicant: SEKISUI POLYMATECH CO., LTD., Saitama (JP)

(72) Inventors: Tsubasa Kamiya, Saitama (JP); Hideaki Konno, Koshigaya (JP); Yasuyoshi Watanabe, San Jose, CA (US)

(73) Assignee: SEKISUI POLYMATECH CO., LTD., Saitama (JP)

( * ) Notice: Subject to any disclaimer, the term of this patent is extended or adjusted under 35 U.S.C. 154(b) by 248 days.

(21) Appl. No.: 17/629,889

(22) PCT Filed: Aug. 5, 2020

(86) PCT No.: PCT/JP2020/030087

§ 371 (c)(1),
(2) Date: Jan. 25, 2022

(87) PCT Pub. No.: WO2021/029307

PCT Pub. Date: Feb. 18, 2021

(65) Prior Publication Data

US 2022/0255242 A1 Aug. 11, 2022

(30) Foreign Application Priority Data

Aug. 9, 2019 (JP) ................................ 2019-148144

(51) Int. Cl.

*H01R 4/04* (2006.01)
*H01R 11/01* (2006.01)
*H01R 43/00* (2006.01)

(52) U.S. Cl.

CPC ............... *H01R 4/04* (2013.01); *H01R 11/01* (2013.01); *H01R 43/007* (2013.01)

(58) Field of Classification Search

CPC ......... H01R 4/04; H01R 11/01; H01R 43/007

(Continued)

(56) References Cited

U.S. PATENT DOCUMENTS 6,690,564 B1 * 2/2004 Haruta ................. H01R 43/007 361/220
7,618,267 B2 * 11/2009 Konno ............... H01R 13/2414 439/91

(Continued)

FOREIGN PATENT DOCUMENTS

CN 1297421 5/2001
CN 1765016 4/2006

(Continued)

OTHER PUBLICATIONS

International Search Report dated Oct. 20, 2020 in International (PCT) Application No. PCT/JP2020/030087.

*Primary Examiner* — Timothy J Thompson
*Assistant Examiner* — Michael F McAllister
(74) *Attorney, Agent, or Firm* — Wenderoth, Lind & Ponack, L.L.P.

(57) ABSTRACT

A connection component can be firmly secured to an adherend member, in a state where a conductive member is compressed, to prevent a bubble from remaining in a securing member. The connection component includes a metal terminal, the conductive member provided on one surface of the metal terminal and deformable by compression, the securing member bonded to one surface of the metal terminal, and an exhaust path provided in at least one of the metal terminal and the securing member. The exhaust path is connected to or provided in at least one of a first securing surface of the securing member that is bonded to the metal terminal, and a second securing surface that is opposite to the first securing surface. The exhaust path exhausts a (Continued)

bubble generated in at least one of the first securing surface and the second securing surface.

18 Claims, 17 Drawing Sheets

(58) Field of Classification Search
USPC .......................................................... 174/259
See application file for complete search history.

(56) References Cited

U.S. PATENT DOCUMENTS

| | | | | |
|---|---|---|---|---|
| 8,439,690 | B2 * | 5/2013 | Takeuchi ............... | H05K 3/341 439/66 |
| 2006/0199405 | A1 * | 9/2006 | Sato ..................... | G01R 1/0735 439/91 |
| 2007/0224416 | A1 | 9/2007 | Matsubayashi et al. | |
| 2009/0053907 | A1 * | 2/2009 | Konno ............... | H01R 13/2414 439/38 |
| 2011/0318961 | A1 * | 12/2011 | Konno ................. | H01R 43/007 439/586 |
| 2015/0155646 | A1 | 6/2015 | Takeuchi et al. | |
| 2018/0254570 | A1 * | 9/2018 | Terashima ........... | H01R 12/718 |

FOREIGN PATENT DOCUMENTS

| | | |
|---|---|---|
| CN | 108352640 | 7/2018 |
| EP | 3 373 394 | 9/2018 |
| JP | 4-63426 | 5/1992 |
| JP | 2002-184546 | 6/2002 |
| JP | 2009-043459 | 2/2009 |
| JP | 2013-214423 | 10/2013 |
| JP | 6070707 | 2/2017 |
| JP | 2018-186064 | 11/2018 |

* cited by examiner

CONNECTION COMPONENT AND CONNECTION STRUCTURE

TECHNICAL FIELD

The present invention relates to a connection component and a connection structure.

BACKGROUND ART

In window glass for automobiles that is provided with in-vehicle equipment such as a defroster or a defogger, a power feeding part comprising a conductive layer is formed on a glass plate, and the in-vehicle equipment functions when the power feeding part is supplied with electricity. For the in-vehicle equipment to function, a connection component that comprises a terminal for supplying electricity to the power feeding part and can be fixed to the power feeding part needs to be connected. Heretofore, lead solder has been broadly used to connect the connection component to the power feeding part. However, with spread of restriction on the use of lead, replacement with lead-free solder has been required. Lead-free solder, however, has a melting point 20 to 45° C. higher than lead solder, and has a problem of insufficient securing and being liable to peeling.

To replace the lead-free solder, use of a connection component comprising a conductive rubber or the like is being studied (see, for example, PTL1). In a case of using the connection component comprising the conductive rubber, for preventing a high temperature state when large current flows, it is necessary to lower electrical resistance by closely attaching the conductive rubber to the power feeding part. Therefore, the connection component may in some cases be bonded to an adherend component that comprises the power feeding part, with a securing member such as a thermosetting adhesive, in a state where the conductive rubber is compressed to come into contact with the power feeding part.

CITATION LIST

Patent Literature

PTL1: JP 6070707 B

SUMMARY OF INVENTION

Technical Problem

However, in a case where a connection component and a component to be connected are fixed with a securing member such as an adhesive in a state where a conductive member such as a conductive rubber is compressed as described above, a bubble generated during the compression of the conductive member is likely to remain in the securing member. If the bubble remains in the securing member, a securing area decreases, and attachability deteriorates. Furthermore, if a temperature increases in a state where the bubble remains in the securing member, the bubble expands, making it difficult to maintain the compressed state, and a problem such as peeling off occurs.

To solve the problem, an object of the present invention is to provide a connection component and a connection structure, where the connection component can be firmly secured to an adherend member, in a state where a conductive member is compressed, to prevent a bubble from remaining in a securing member.

Solution to Problem

As a result of earnest studies for solving the above problem, the present inventor has found that the above problem can be solved by providing at least one of a metal terminal and a securing member with an exhaust path configured to exhaust a bubble, and the inventor has completed the present invention as follows.

The present invention is summarized in [1] to [18] as follows.

[1] A connection component comprising:

a metal terminal, a conductive member provided on one surface of the metal terminal and deformable by compression, a securing member bonded to one surface of the metal terminal, and an exhaust path provided in at least one of the metal terminal and the securing member, the exhaust path being connected to or provided in at least one securing surface of: a first securing surface of the securing member that is bonded to the metal terminal; and a second securing surface that is an opposite surface to the first securing surface, the exhaust path exhausting a bubble generated in at least one of the first securing surface and the second securing surface.

[2] The connection component according to the above [1], wherein the exhaust path comprises at least one of a first exhaust groove provided in a first main surface of the metal terminal that is bonded to the securing member, a second exhaust groove provided in the first securing surface, and a third exhaust groove provided in the second securing surface.

[3] The connection component according to the above [2], wherein the first exhaust groove, the second exhaust groove and the third exhaust groove reach an edge of the securing member.

[4] The connection component according to any one of the above [1] to [3], wherein the metal terminal comprises a first main surface bonded to the securing member, and a second main surface that is an opposite surface to the first main surface, and the exhaust path comprises a first exhaust hole extending through the first main surface and the second main surface.

[5] The connection component according to the above [4], wherein the first exhaust hole communicates with at least one of the first exhaust groove and the second exhaust groove.

[6] The connection component according to any one of the above [1] to [5], wherein the exhaust path comprises a second exhaust hole extending through the first securing surface and the second securing surface.

[7] The connection component according to the above [6], wherein the second exhaust hole communicates with at least one of the first exhaust groove, the second exhaust groove, the third exhaust groove and the first exhaust hole.

[8] The connection component according to any one of the above [1] to [7], further comprising:

a coupling member coupling the conductive member and the securing member.

[9] The connection component according to the above [8], wherein the second exhaust hole extends through the coupling member.

[10] The connection component according to any one of the above [1] to [9], wherein the exhaust path is a bottomed hole.

[11] The connection component according to any one of the above [1] to [10], wherein the exhaust path is disposed around the conductive member.

[12] The connection component according to any one of the above [1] to [11], wherein a shortest distance between the exhaust path and the conductive member is 15 mm or less.

[13] The connection component according to any one of the above [1] to [12], wherein the metal terminal comprises a first main surface bonded to the securing member, and a second main surface that is an opposite surface to the first main surface, and the second main surface comprises a projection.

[14] The connection component according to any one of the above [1] to [13], wherein the metal terminal comprises a first main surface bonded to the securing member, and the first main surface comprises a portion in contact with the conductive member, the portion being in a projecting shape.

[15] The connection component according to any one of the above [1] to [14], wherein the metal terminal comprises a tab terminal for cable connection.

[16] The connection component according to any one of the above [1] to [15], wherein the securing member comprises a pressure-sensitive adhesive layer or a pressure-sensitive adhesive double coated tape.

[17] The connection component according to any one of the above [1] to [16], wherein the conductive member comprises a rubber-like elastic body comprising a conductive filler.

[18] A connection structure comprising:

a component to be connected, a metal terminal, a conductive member disposed between the metal terminal and the component to be connected, the metal terminal and the component to be connected having electrical continuity via the conductive member, a securing member disposed between the metal terminal and the component to be connected, the securing member securing the metal terminal and the component to be connected, in a state where the conductive member comes into contact with both of the metal terminal and the component to be connected and is compressed, and an exhaust path provided in at least one of the metal terminal and the securing member, the exhaust path being provided in or connected to at least one securing surface of a first securing surface of the securing member that is bonded to the metal terminal, and a second securing surface of the securing member that is bonded to the component to be connected, the exhaust path exhausting a bubble generated in at least one of the first securing surface and the second securing surface.

Advantageous Effects of Invention

The present invention provides a connection component and a connection structure, where the connection component can be firmly secured to an adherend member, in a state where a conductive member is compressed, to prevent a bubble from remaining in a securing member.

DESCRIPTION OF EMBODIMENTS

Hereinafter, description will be made as to the present invention by use of embodiments.

First Embodiment

[Connection Component]

Figure 1:
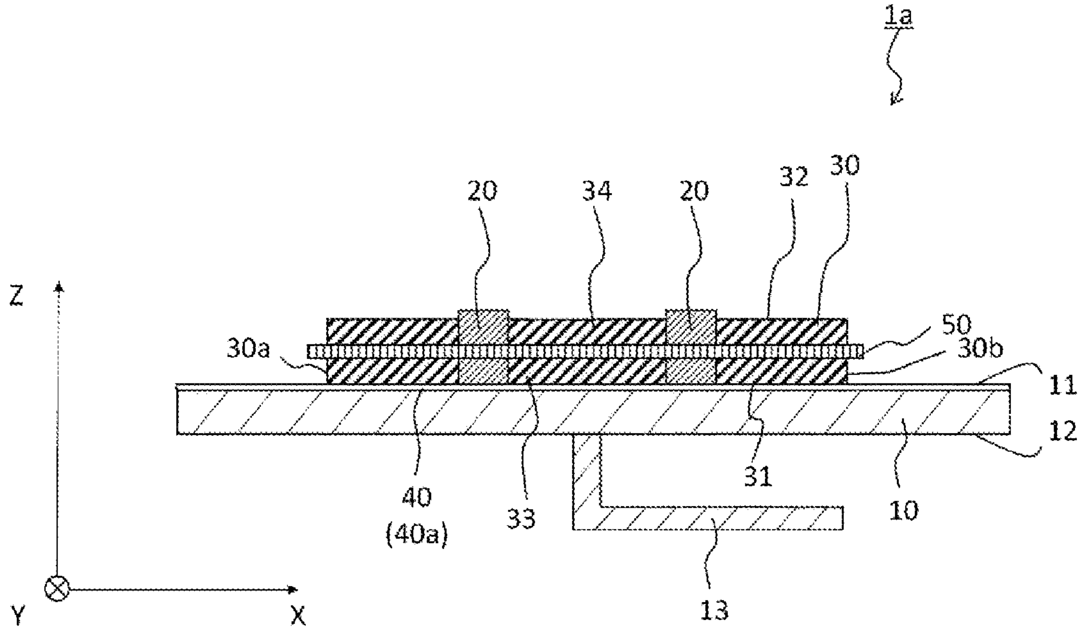
FIG. 1 is a cross-sectional view of a connection component according to a first embodiment.

As shown in FIG. 1, a connection component 1*a* according to a first embodiment of the present invention comprises a metal terminal 10, a conductive member 20 that is disposed on one surface (hereinafter, referred to also as a first main surface 11) of the metal terminal 10 and deformable by compression, a securing member 30 bonded to the first main surface 11 of the metal terminal 10, and an exhaust path 40 provided in the metal terminal 10.

Figure 2:
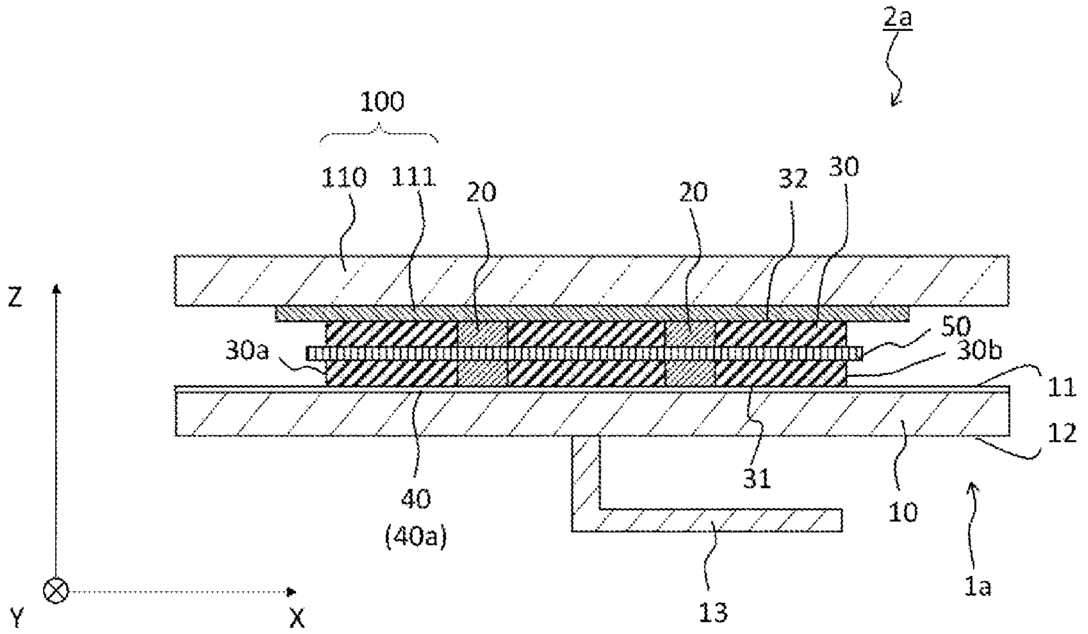
FIG. 2 is a cross-sectional view of a connection structure according to the first embodiment.

As shown in FIG. 2, the connection component 1*a* is a connection component that connects to a component 100 to be connected.

In the connection component 1*a*, the conductive member 20, compressed in a thickness direction Z, comes into contact with the metal terminal 10 and the component 100 to be connected, and via the conductive member, the metal terminal 10 and the component 100 to be connected have electrical continuity. The conductive member 20 is in a compressed state in the thickness direction Z, and the conductive member 20 is accordingly sufficiently closely attached to the metal terminal 10 and the component 100 to be connected, so that electrical resistance in the conductive member 20 can be kept low. When the electrical resistance in the conductive member 20 is kept low, the conductive member 20 can be prevented from being in a high temperature state even in an environment where large current flows.

(Metal Terminal)

The metal terminal 10 has a first main surface 11 bonded to the securing member 30, and a second main surface 12 that is an opposite surface to the first main surface 11. The metal terminal 10 has the first main surface 11 coming into contact with the conductive member 20, and has electrical continuity with the conductive member 20. In addition, the metal terminal 10 is, for example, in a form of a flat plate, and the first and second main surfaces 11 and 12 are generally surfaces vertical to the thickness direction Z (parallel to the XY plane), but do not have to be parallel to the XY plane. Also, the thickness direction Z is a thickness direction of the conductive member 20, and current flows through the conductive member 20 along the thickness direction Z.

The metal terminal 10 may comprise a tab terminal 13 for cable connection. The tab terminal 13 can be formed, for example, in conformity with JIS C2809. In a case where the tab terminal 13 is, for example, a male terminal as shown in FIG. 2, the terminal can easily obtain electrical continuity with a mating female terminal by inserting and fitting the male terminal into the female terminal. Needless to say, the tab terminal 13 may be a female terminal.

A material of the metal terminal 10 is not particularly limited, and must only be metal having conductivity such as gold, silver, platinum, aluminum, copper, iron, nickel, palladium, chromium, or stainless steel, or an alloy of any of these metals. Also, a material of the tab terminal 13 is not particularly limited, and must only be similarly metal having conductivity such as gold, silver, platinum, aluminum, copper, iron, nickel, palladium, chromium, or stainless steel, or an alloy of any of these metals.

(Conductive Member)

The conductive member 20 may be one, and it is preferable to provide a plurality of conductive members as shown in FIG. 1. In a case where a plurality of conductive members 20 are provided, the metal terminal 10 and the component 100 to be connected are electrically connected via the plurality of conductive members 20. Consequently, when large current flows between the metal terminal 10 and the component 100 to be connected, electrical resistance of each conductive member 20 is kept low, and temperature rise in the conductive member 20 is accordingly suppressed.

Furthermore, when a plurality of small conductive members 20 are provided, a load is smaller during compression of the whole plurality of conductive members 20 than when a single conductive member 20 with a large area is provided, and hence peeling off of the connection component 1*a* due to resilience of the conductive members 20 can be prevented.

A diameter of the conductive member 20 is not particularly limited, and is, for example, from 0.4 to 5.0 mm, preferably from 0.8 to 4.0 mm. Note that the diameter is a distance between positions of two points that are farthest from each other in a cross section of each element (e.g., the conductive member). Also, a thickness of the conductive member 20 is not particularly limited, and is, for example, from 0.5 to 4.0 mm, preferably from 0.6 to 3.0 mm.

The conductive member 20 is not particularly limited as long as the member can maintain a compressed state and has conductivity, and as an example of the member, a conductive rubber containing a conductive filler is used. The conductive member 20 may be entirely or partially conductive rubber. In an example of the conductive member that is partially conductive rubber, a conductive part made of conductive rubber is disposed in a central part, and an insulation part is disposed to surround an outer periphery of the conductive part.

In addition to conductive rubber, examples of the conductive member include a rubber-like elastic body in which fine metal wires are arranged, a rubber-like elastic body around which a metal foil or metal cloth is wound, a metal spring and the like.

The conductive member that is entirely conductive rubber is obtained by evenly mixing a conductive filler in a rubber-like elastic body.

As the conductive filler to be mixed in the conductive rubber, there may be used a carbon filler made of conductive carbon black, carbon fiber, graphite or the like; a metal filler or alloy filler made of silver, copper, nickel, gold, tin, zinc, platinum, palladium, iron, tungsten, molybdenum, solder or the like; or a conductive filler prepared by covering, with a conductive coating made of metal or the like, surfaces of particles of any of these materials. Alternatively, as the conductive filler, there may be used, for example, a conductive filler obtained by applying a conductive coating made of metal or the like to surfaces of polymer particles that are non-conductive particles made of polyethylene, polystyrene, phenol resin, epoxy resin, acryl resin or benzoguanamine resin, or inorganic particles made of glass beads, silica, graphite or ceramic. Examples of a shape of the conductive filler include particulate, fibrous, fragment and fine line shapes. One type of conductive filler may be used alone, or two or more types may be used together.

As the rubber-like elastic body, a thermosetting rubber, thermoplastic elastomer or the like can be exemplified. Examples of the thermosetting rubber include a silicone rubber, natural rubber, isoprene rubber, butadiene rubber, acrylonitrile butadiene rubber, styrene butadiene rubber, chloroprene rubber, nitrile rubber, butyl rubber, ethylene propylene rubber, acrylic rubber, fluororubber, and urethane rubber. Above all, silicone rubber excellent in forming processability, electrical insulation, weatherability and the like is preferable. Examples of the thermoplastic elastomer include a styrene-based thermoplastic elastomer, olefin-based thermoplastic elastomer, ester-based thermoplastic elastomer, urethane-based thermoplastic elastomer, polyamide-based thermoplastic elastomer, vinyl chloride thermoplastic elastomer, fluorine-based thermoplastic elastomer, and ion cross-linked thermoplastic elastomer. For the rubber-like elastic body, one type selected from the above examples may be used alone, or two or more types may be used together.

Figure 3:
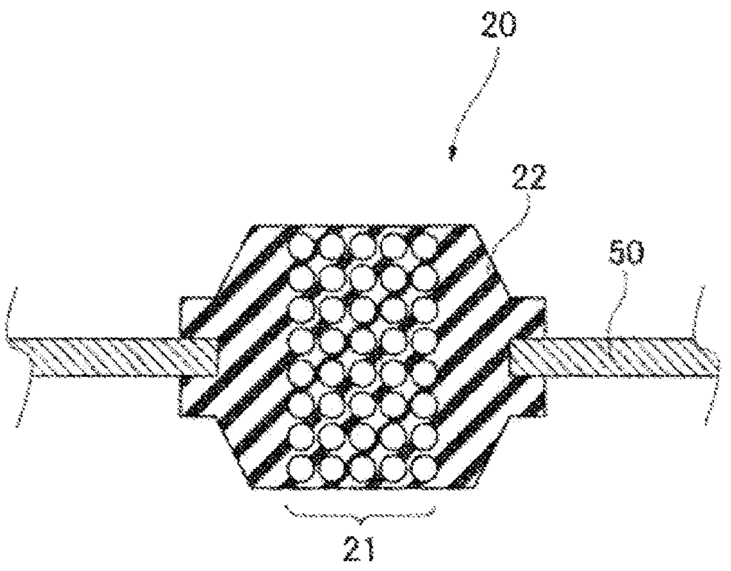
FIG. 3 is a cross-sectional view showing a conductive member of the connection component according to the first embodiment.

As shown in FIG. 3, the conductive member 20 comprising the conductive rubber disposed in a central part comprises a conductive part 21 obtained by mixing the conductive filler in the rubber-like elastic body, and an insulation part 22 made of the rubber-like elastic body is disposed to surround an outer periphery of the conductive part. In addition, FIG. 3 does not show the securing member 30, but the securing member 30 is preferably provided to surround the conductive member 20 (i.e., the insulation part 22) as will be described later.

It is preferable that the conductive filler mixed in the conductive part 21 is arranged continuously in the thickness direction Z. When the conductive filler is arranged continuously in the thickness direction Z, electrical resistance can be low even with a small compressive load. As a filler that is arranged continuously in the thickness direction Z of the connection component 1*a*, the same conductive filler as described above may be used.

Also, it is more preferable to arrange the conductive filler mixed in the conductive part 21, in a chain in the thickness direction Z by applying a magnetic field. When the conductive filler is arranged in the chain in the thickness direction Z, the electrical resistance can be lower even with the small compressive load. It is preferable that the conductive filler arranged in the chain in the thickness direction Z by applying the magnetic field is a magnetic conductive filler having magnetism and being arranged in a chain locally depending on the magnetic field or the like.

Examples of the magnetic conductive filler include nickel, cobalt, iron and ferrite, and an alloy of any of these metals. One type of magnetic conductive filler may be used alone, or two or more types may be used together.

As the rubber-like elastic body included in the conductive part 21, the aforementioned thermosetting rubber, thermoplastic elastomer or the like can be exemplified. The rubber-like elastic body included in the conductive part 21 facilitates the arrangement of the conductive filler in the thickness direction, for example, by applying the magnetic field, and from this viewpoint, it is preferable that the rubber-like elastic body is obtained by curing liquid rubber that is liquid at normal temperature (23° C.) and under normal pressure (1 atm) before cured, or that the rubber-like elastic body can be melted when heated. As the rubber-like elastic body included in the conductive part, one type selected from the above examples may be used alone, or two or more type may be used together.

As the rubber-like elastic body included in the insulation part 22, the aforementioned thermosetting rubber, thermoplastic elastomer and the like can be exemplified. Also, as the rubber-like elastic body included in the insulation part, similarly, one type may be used alone, or two or more types may be used together.

It is preferable that the rubber-like elastic bodies included in the conductive part 21 and the insulation part 22 are integrally formed. Therefore, it is preferable to use the same type of rubber-like elastic body to be included in the conductive part 21 and the insulation part 22, and it is more preferable to use silicone rubber as the rubber-like elastic body to be included in the conductive part 21 and the insulation part 22.

In the conductive member 20 comprising fine metal wire arranged in the rubber-like elastic body, a plurality of fine metal wires are arranged along the thickness direction Z in the rubber-like elastic body. Examples of metal included in the fine metal wire include metals having conductivity, such as gold, silver, platinum, aluminum, copper, iron, nickel, palladium, chromium, and stainless steel, and an alloy of any of these metals. The fine metal wire has a diameter that is preferably from 0.01 to 0.2 mm, more preferably from 0.02 to 0.1 mm, from a viewpoint of having a proper elasticity and a suitable conductivity.

The conductive member 20 comprising the rubber-like elastic body around which the metal foil or metal cloth is wound is obtained by winding the metal foil or metal cloth around the rubber-like elastic body in the thickness direction Z of the conductive member 20, the metal foil or metal cloth being made of metal having conductivity, such as gold, silver, platinum, aluminum, copper, iron, nickel, palladium, chromium, or stainless steel, or an alloy of any of these metals. It is preferable that the metal foil or metal cloth has a thickness of 0.001 to 0.1 mm, from a viewpoint of having the proper elasticity and suitable conductivity.

The conductive member 20 that is a metal spring is made of metal having conductivity, such as gold, silver, platinum, aluminum, copper, iron, nickel, palladium, chromium, or stainless steel, or an alloy of any of these metals. Examples of the metal spring include a coil spring and a leaf spring.

(Securing Member and Coupling Member)

As shown in FIG. 2, the securing member 30 is a member bonded to both the metal terminal 10 and the component 100 to be connected, and securing the metal terminal 10 and the component 100 to be connected. The connection component 1*a* comprises the securing member 30, so that the metal terminal 10 and the component 100 to be connected can be electrically connected to each other via the conductive member 20, and the metal terminal 10 can be securely and easily fixed to the component 100 to be connected. Consequently, even when the conductive member 20 is fixed in the compressed state as described above, the connection component 1*a* is hard to peel off from the component 100 to be connected.

The securing member 30 of the present embodiment comprises a first securing surface 31, and a second securing surface 32 that is an opposite surface to the first securing surface 31, and each of the first securing surface 31 and the second securing surface 32 is an adherable surface. The first and second securing surfaces 31 and 32 are usually parallel to the XY-plane vertical to a Z-direction, but do not have to be parallel to the XY-plane. The first securing surface 31 is bonded to the metal terminal 10, and the second securing surface 32 is bonded to the component 100 to be connected.

It is preferable that the securing member 30 is formed to surround a periphery of each of the conductive members 20, from a viewpoint of stabilizing and fixing the conductive member 20 in the compressed state. In a case of surrounding the periphery of the conductive member 20, the securing member 30 may be bonded to an entire surface of the first main surface 11 of the metal terminal 10, or be bonded to a part of the first main surface. Needless to say, the securing member 30 does not have to surround the periphery of the conductive member 20, as long as the securing member is formed around the conductive member.

As shown in FIG. 1, it is preferable that the securing member 30 has a thickness smaller than the thickness of the conductive member 20. Note that the thickness of the securing member 30 is a distance between the first securing surface 31 and the second securing surface 32 along the thickness direction Z. When the thickness of the securing member 30 is smaller than the thickness of the conductive member 20, the connection component 1*a* can be fixed to the component 100 to be connected, with the conductive member 20 being in a compressed state. The thickness of the securing member 30 is not particularly limited, and is, for example, from 0.1 to 3.0 mm, preferably from 0.3 to 2.7 mm.

The connection component 1*a* in the present embodiment may further comprise a coupling member 50 coupling the conductive member 20 and the securing member 30, as shown in FIG. 1.

The coupling member 50 is a planar sheet-like member, and comprises, for example, a resin sheet. The resin sheet is not particularly limited, as long as having a certain strength that can couple the conductive member 20 and the securing member 30. Alternatively, as the resin sheet, a resin sheet having flexibility may be used. As the resin sheet, for example, a polyethylene terephthalate (PET) sheet, polyethylene naphthalate sheet, polycarbonate sheet, polyetheretherketone sheet, polyimide sheet, polyamide sheet, polyethylene sheet, polypropylene sheet, polyurethane sheet or the like is used. Among these, the PET sheet and the polyimide sheet are preferable from a viewpoint of durability, heat resistance or the like, and the polyimide sheet is preferable from a viewpoint of improving positional accuracy of the conductive member 20.

A thickness of the coupling member 50 (resin sheet) is not particularly limited, and is, for example, from 30 to 500 μm, preferably from 50 to 350 μm.

In a case where a plurality of conductive members 20 are provided, the coupling member 50 may couple the plurality of conductive members 20 together. In the coupling member 50, for example, a through hole may be provided, and each conductive member 20 may be inserted into each through hole and fixed to the coupling member 50.

In the securing member 30, a pressure-sensitive adhesive, an adhesive or the like is used. The pressure-sensitive adhesive is an adhesive that provides adhesion only by applying pressure at normal temperature. As the pressure-sensitive adhesive, a known pressure-sensitive adhesive is usable, and examples of the pressure-sensitive adhesive include an acrylic pressure-sensitive adhesive, urethane pressure-sensitive adhesive, silicone pressure-sensitive adhesive and rubber pressure-sensitive adhesive. The adhesive is not particularly limited, as long as having adhesiveness that can cause the metal terminal 10 to be bonded to the component 100 to be connected, and examples of the adhesive include a hot melt adhesive, thermosetting adhesive, ultraviolet-curable adhesive and moisture-curable adhesive.

In the securing member 30, the first securing surface 31 and second securing surface 32 may comprise an adhesive or pressure-sensitive adhesive, and preferably comprises a pressure-sensitive adhesive. When each securing surface comprises the pressure-sensitive adhesive, the connection component 1*a* and the component 100 to be connected can be secured only by bringing the connection component 1*a* comprising the securing member 30 into contact with the component 100 to be connected, followed by pressing.

As shown in FIG. 1, the securing member 30 may comprise a first securing part 33 and a second securing part 34 that are provided on opposite surfaces of the sheet-like coupling member 50, respectively. Each of the first securing part 33 and the second securing part 34 may comprise a pressure-sensitive adhesive layer alone, or a pressure-sensitive adhesive double coated tape. The pressure-sensitive adhesive double coated tape comprises a base material, and pressure-sensitive adhesive layers that are provided on opposite surfaces of the base material, respectively. The pressure-sensitive adhesive layer is a layer made of the above pressure-sensitive adhesive.

In a case of the pressure-sensitive adhesive layer alone, the pressure-sensitive adhesive layer may be laminated on a surface of the sheet-like coupling member 50. In a case of laminating the pressure-sensitive adhesive layer, the pressure-sensitive adhesive may be applied to the coupling member 50 with known means.

Also, in a case of the pressure-sensitive adhesive double coated tape, one pressure-sensitive adhesive layer may be bonded to the coupling member 50, and a surface of the other pressure-sensitive adhesive layer may be the first or second securing surface.

As the base material of the pressure-sensitive adhesive double coated tape, a known material for use as the base material of the pressure-sensitive adhesive double coated tape is usable, and examples of the base material include a resin film, nonwoven cloth and foam sheet.

(Exhaust Path)

In the present embodiment, the exhaust path 40 is a first exhaust groove 40*a* provided in the metal terminal 10, more specifically in the first main surface 11 of the metal terminal 10. The first exhaust groove 40*a* may be provided in a surface bonded to at least the securing member 30.

The first exhaust groove 40*a* is connected to the first securing surface 31, and can exhaust a bubble generated in the first securing surface 31 (more specifically, an interface between the first securing surface 31 and the first main surface 11). Specifically, the exhaust path 40*a* can exhaust a bubble generated in the first securing surface 31 (i.e., the above interface), when the securing member 30 is bonded to the metal terminal 10.

As shown in FIG. 1, the first exhaust groove 40*a* may have a structure to reach an edge of the metal terminal 10. When the first exhaust groove 40*a* reaches the edge, the exhaust path 40 reaches outside without being covered with the first securing surface 31, and hence the bubble in the interface can be effectively exhausted to the outside. However, the first exhaust groove 40*a* does not have to reach the edge of the metal terminal 10, and may only reach edges 30*a* and 30*b* of the securing member 30. When reaching the edges 30*a* and 30*b* of the securing member 30, the exhaust path 40 reaches the outside at the edges 30*a* and 30*b* of the securing member 30, and the bubble generated in the first securing surface 31 can be exhausted from the edges 30*a* and 30*b* to the outside.

The first exhaust groove 40*a* may be formed by general metal processing such as milling, laser processing or the like.

The first exhaust groove 40*a* may have any aspect as long as being able to exhaust the bubble to the outside, and may be, for example, straight or curved. Also, respective linear grooves may cross one another, or do not have to cross.

Figure 4:
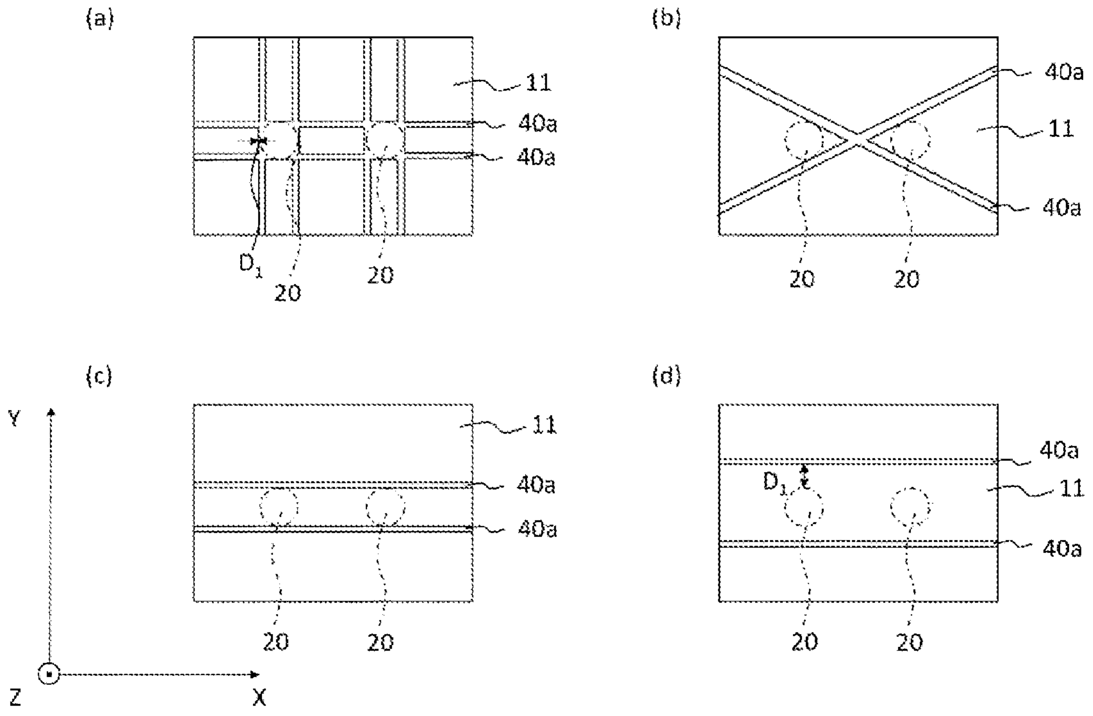
FIGS. 4(*a*) to 4(*d*) are plan views showing an exhaust path of the connection component according to the first embodiment.

As shown in FIGS. 4(*a*) to 4(*d*), it is preferable that the first exhaust groove 40*a* is disposed around the conductive member 20. When the metal terminal 10 is bonded to the securing member 30 while compressing the conductive member 20, a bubble is likely to be generated around the conductive member 20. When the first exhaust groove 40*a* is disposed around the conductive member 20, the bubble generated in the interface between the metal terminal 10 and the securing member 30 can be efficiently exhausted. In a case where the first exhaust groove 40*a* (exhaust path 40) is disposed around the conductive member 20, a shortest distance $D_1$ between the first exhaust groove 40*a* (exhaust path 40) and the conductive member 20 is preferably 15 mm or less, more preferably 10 mm or less, most preferably 0 mm. Specifically, it is most preferable that the first exhaust groove 40*a* is disposed to be in contact with the conductive member 20.

Also, the first exhaust groove 40*a* has a width that is, for example, from 0.1 to 5.0 mm, preferably from 0.2 to 3.0 mm, and has a depth that is, for example, from 0.01 to 2.0 mm, preferably from 0.02 to 1.0 mm.

Further, in the case where a plurality of conductive members 20 are provided, it is preferable that the first exhaust groove 40*a* (exhaust path 40) is disposed to be positioned between the conductive members 20 and 20. When the first exhaust groove 40*a* is disposed to be positioned between the plurality of conductive members 20, a bubble likely to be generated between the conductive members 20 can be efficiently exhausted.

A positional relation between the first exhaust groove 40*a* provided in the first main surface 11 of the metal terminal 10 and the conductive member 20 will be more specifically described with reference to FIGS. 4(*a*) to 4(*d*).

First exhaust grooves 40*a* shown in FIG. 4(*a*) are arranged in a grid pattern in the first main surface 11. First exhaust grooves 40*a* shown in FIG. 4(*b*) are arranged in an X-pattern in the first main surface 11. For first exhaust grooves 40*a* shown in each of FIGS. 4(*c*) and 4(*d*), two first exhaust grooves are arranged in parallel with each other.

Each of the first exhaust grooves 40*a* shown in FIGS. 4(*a*) to (*c*) is disposed to be in contact with a position to which the conductive member 20 is connected in the first main surface 11. Also, the first exhaust groove 40*a* shown in FIG. 4(*d*) is disposed at a position close to the conductive member 20. Specifically, in FIGS. 4(*a*) to (*d*), the first exhaust groove 40*a* is disposed around the conductive member 20, and hence a bubble generated in the first securing surface 31 around the conductive member 20 can be exhausted through the first exhaust groove 40*a*.

In addition, in FIGS. 4(*a*) to (*c*), the first exhaust groove 40*a* is disposed to be in contact with the conductive member 20, and hence the shortest distance between the first exhaust groove 40*a* and the conductive member 20 is 0 mm.

The first exhaust groove 40*a* shown in FIG. 4(*d*) is disposed at a position away from the position to which the conductive member 20 is connected in the first main surface 11. In FIG. 4(*d*), the shortest distance between the first exhaust groove 40*a* and the conductive member 20 is denoted with $D_1$. The shortest distance $D_1$ is 15 mm or less as described above. As shown in FIG. 4(*d*), even when the first exhaust groove 40*a* is not in contact with but is close to the conductive member 20, a bubble generated around the conductive member 20 when the first securing surface 31 is bonded to the metal terminal 10 can be efficiently exhausted.

Furthermore, as shown in FIGS. 4(*a*) to (*d*), the respective conductive members 20 may be sandwiched between or surrounded with two or more pairs of first exhaust grooves 40*a*. With such an aspect, a bubble generated around the conductive members 20 can be more efficiently exhausted.

Furthermore, the first exhaust groove 40*a* (exhaust path 40) may position the conductive member 20, when the conductive member is fixed to the metal terminal 10 with the securing member 30. For example, when the conductive member 20 is disposed to be sandwiched between or surrounded with the first exhaust grooves 40*a* as described above, each first exhaust groove 40*a* appropriately functions as a positioning member. In this case, if the first exhaust groove 40*a* is disposed to be in contact with the conductive member 20, the first exhaust groove 40*a* more appropriately functions for the positioning purpose.

(Connection Structure)

A connection structure 2*a* according to the first embodiment of the present invention comprises the connection component 1*a* that is mentioned above with the component 100 to be connected, as shown in FIG. 2. That is, the connection structure 2*a* comprises the component 100 to be connected, the metal terminal 10, the conductive member 20, and the securing member 30.

The conductive member 20 and the securing member 30 are arranged between the metal terminal 10 and the component 100 to be connected. For the securing member 30, the first and second securing surfaces 31 and 32 of the securing member 30 bonded to the metal terminal 10 and the component 100 to be connected, respectively. The securing member 30 secures the metal terminal 10 and the component 100 to be connected in such a manner that the conductive member 20 comes into contact with and is in a compressed state between both of the metal terminal 10 and the component 100 to be connected. Consequently, the metal terminal 10 and the component 100 to be connected are maintained in an electrically continuous state via the conductive member 20.

The component 100 to be connected comprises, for example, a member 110 to be connected, such as a glass plate, and a power feeding part 111 formed on a surface of the member 110 to be connected. The power feeding part 111 is a part for feeding power to a linear conductor such as a defroster, a defogger or an antenna element formed linearly on the surface of the member 110 to be connected. The conductive member 20 comes into contact with the power feeding part 111 to cause the metal terminal 10 and the member 110 to be connected to have electrical continuity.

In preparation of the connection structure 2*a* according to the first embodiment of the present invention, first the conductive member 20 and the securing member 30 coupled with the coupling member 50 are prepared, and next the first securing surface 31 of the securing member 30 is caused to be bonded to the first main surface 11 of the metal terminal 10 to obtain the connection component 1*a*. The obtained connection component 1*a* may be secured to the component 100 to be connected via the second securing surface 32 of the securing member 30, to obtain the connection structure 2*a*.

Alternatively, the connection structure 2*a* may be obtained by first securing, to the component 100 to be connected, the conductive member 20 and securing member 30 coupled with the coupling member 50, via the second securing surface 32, and then attaching the metal terminal 10 to the first securing surface 31.

According to the connection component 1*a* and connection structure 2*a* of the first embodiment of the present invention, the first exhaust groove 40*a* is provided as the exhaust path 40 in the first main surface 11 of the metal terminal 10, so that a bubble generated in the first securing surface 31 of the securing member 30 can be suitably exhausted. In the connection component 1*a* and the connection structure 2*a*, when the bubble is suitably exhausted, the metal terminal 10 can be securely and easily fixed to the component 100 to be connected in a state where the conductive member 20 is compressed, without any bubbles remaining in the securing member 30.

Second Embodiment

Figure 5:
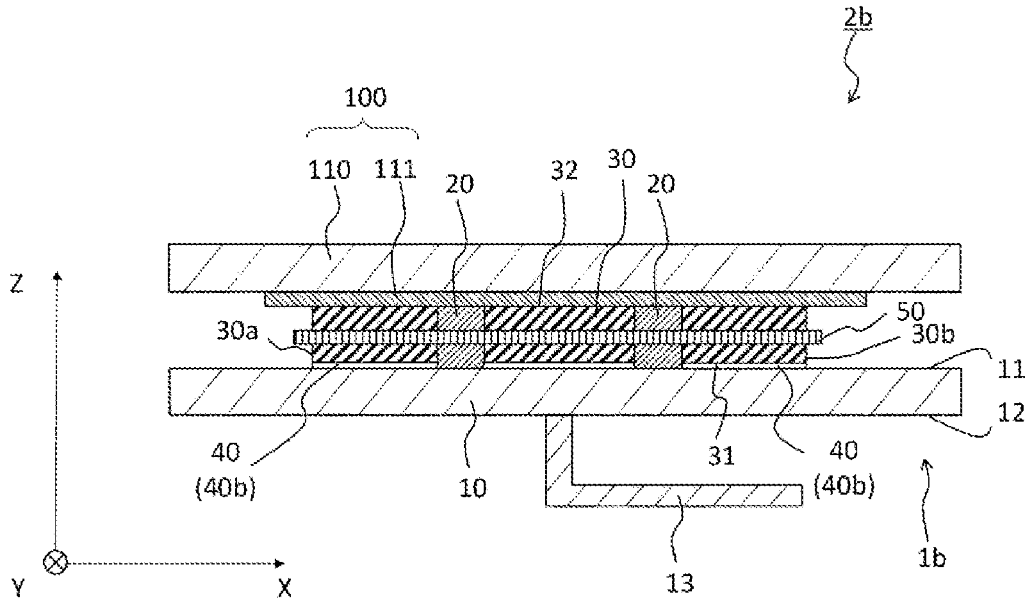
FIG. 5 is a cross-sectional view of a connection component and a connection structure according to a second embodiment.

A connection component 1*b* and a connection structure 2*b* according to a second embodiment are different from the connection component 1*a* and the connection structure 2*a* according to the first embodiment, respectively, in that an exhaust path 40 is provided in a first securing surface 31 of a securing member 30 that is bonded to a metal terminal 10, as shown in FIG. 5.

Hereinafter, differences of the second embodiment from the first embodiment will be described. Also, hereinafter, even in the description of the different embodiment, a member having the same configuration will be denoted with the same reference sign.

The exhaust path 40 in FIG. 5 is a second exhaust groove 40*b* provided in the first securing surface 31, to exhaust a bubble generated in the first securing surface 31. It is preferable that the second exhaust groove 40*b* has a structure to reach edges 30*a* and 30*b* of the securing member 30. With the structure where the second exhaust groove 40*b* reach the edges 30*a* and 30*b*, the bubble generated in the first securing surface 31 (more specifically, an interface between the first securing surface 31 and a first main surface 11) can be exhausted from the edges 30*a* and 30*b* to outside air. The second exhaust groove 40*b* as the exhaust path 40 can be formed by general resin processing such as laser processing. Also, the securing member 30 provided on a peeling sheet having a projection and depression shape of a groove is peeled from the peeling sheet, so that the securing member 30 comprising the second exhaust groove 40*b* can be obtained.

Description will be made as to the second exhaust groove 40*b* provided in the first securing surface 31 of the securing member 30, in more detail with reference to FIGS. 6(*a*) to 6(*e*). A configuration of the second exhaust groove 40*b* is similar to the configuration of the first exhaust groove 40*a*, and the second exhaust groove 40*b* may have a positional relation similar to the positional relation between the first exhaust groove 40*a* provided in the first main surface 11 of the metal terminal 10 and the conductive member 20 shown in FIGS. 4(*a*) to 4(*d*). Specifically, it is preferable that the second exhaust groove 40*b* is disposed around the conductive member 20, and a shortest distance D2 between the second exhaust groove 40*b* and the conductive member 20 is preferably 15 mm or less, more preferably 10 mm or less, most preferably 0 mm as described above. Furthermore, it is similarly preferable that the second exhaust groove 40*b* (exhaust path 40) is disposed to be positioned between conductive members 20 and 20, in a case where a plurality of conductive members 20 are provided.

Furthermore, the second exhaust groove 40*b* has a width that is, for example, from 0.05 to 5.0 mm, preferably from 0.2 to 3.0 mm, and has a depth that is, for example, from 0.01 to 2.0 mm, preferably from 0.02 to 1.0 mm.

Figure 6:
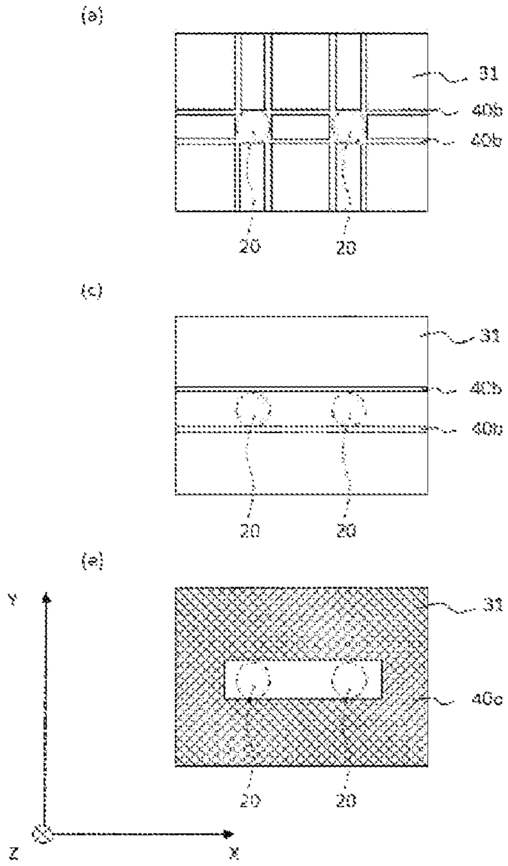
FIGS. 6(*a*) to 6(*e*) are plan views showing an exhaust path of the connection component according to the second embodiment.

Also, more specifically, second exhaust grooves 40*b* shown in FIG. 6(*a*) are arranged in a grid pattern in the first securing surface 31. Second exhaust grooves 40*b* shown in FIG. 6(*b*) are arranged in an X-pattern in the first securing surface 31. For second exhaust grooves 40*b* shown in each of FIGS. 6(*c*) and 6(*d*), two second exhaust grooves are provided, and arranged in parallel with each other. For second exhaust grooves 40*b* shown in FIG. 6(*e*), a plurality of second exhaust grooves 40*b* are provided in the first securing surface 31, and arranged to cross one another, to form a large number of crossing grooves. In the second exhaust grooves 40*b* shown in FIG. 6(*e*), a pitch between adjacent second exhaust grooves 40*b* is, for example, from 0.2 to 1.5 mm, preferably from 0.5 to 1.0 mm.

According to the connection component 1*b* and connection structure 2*b* of the second embodiment of the present invention, the second exhaust groove 40*b* is provided as the exhaust path 40 in the first securing surface 31 of the securing member 30, so that the bubble generated in the first securing surface 31 of the securing member 30 can be suitably exhausted. In the connection component 1*b* and the connection structure 2*b*, when the bubble is suitably exhausted, the metal terminal 10 can be securely and easily fixed to a component 100 to be connected in a state where the conductive member 20 is compressed, without any bubbles remaining in the securing member 30.

Third Embodiment

Figure 7:
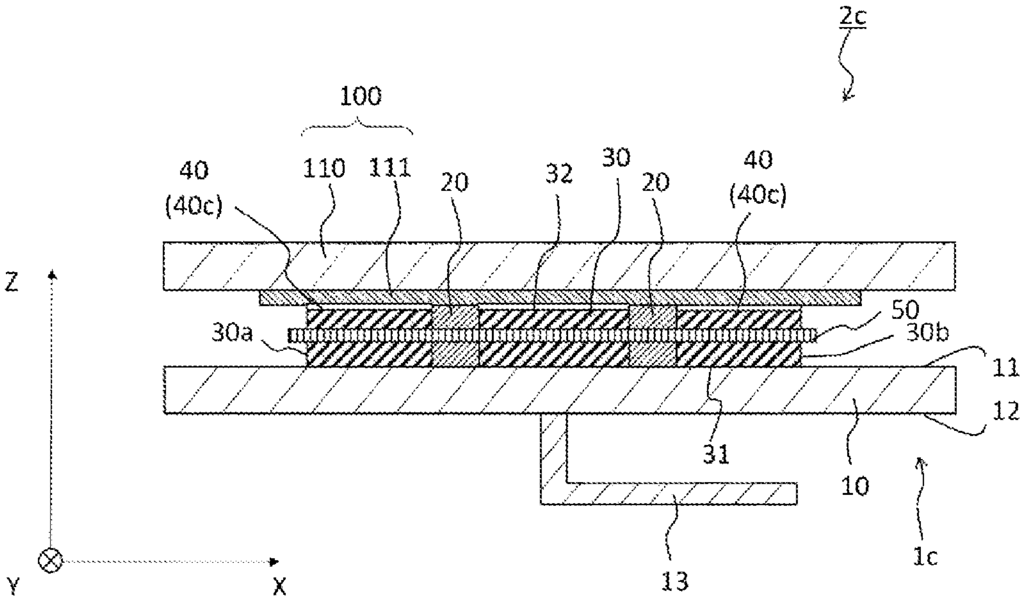
FIG. 7 is a cross-sectional view of a connection component and a connection structure according to a third embodiment.

A connection component 1*c* and a connection structure 2*c* according to a third embodiment are different from the connection component 1*a* and the connection structure 2*a* according to the first embodiment, respectively, in that an exhaust path 40 is provided in a second securing surface 32 of a securing member 30, as shown in FIG. 7.

Hereinafter, difference of the third embodiment from the first embodiment will be described. Also, hereinafter, even in the description of the different embodiment, a member having the same configuration will be denoted with the same reference sign.

The exhaust path 40 in FIG. 7 is a third exhaust groove 40*c* provided in the second securing surface 32 of the securing member 30 that is bonded to a component 100 to be connected, to exhaust a bubble generated in the second securing surface 32. It is preferable that the third exhaust groove 40*c* has a structure to reach edges 30*a* and 30*b* of the securing member 30. With the structure where the third exhaust groove 40*c* reach the edges 30*a* and 30*b*, the bubble generated in the second securing surface 32 can be exhausted from the edges 30*a* and 30*b* to outside air.

The third exhaust groove 40*c* as the exhaust path 40 can be formed by general resin processing such as laser processing. Also, the securing member 30 provided on a peeling sheet having a projection and depression shape of a groove is peeled from the peeling sheet, so that the securing member 30 comprising the third exhaust groove 40*c* can be obtained.

Description will be made as to the third exhaust groove 40*c* provided in the second securing surface 32 of the securing member 30, in more detail with reference to FIGS. 8(*a*) to 8(*e*).

A configuration of the third exhaust groove 40*c* is similar to the configuration of the first exhaust groove 40*a*, and the third exhaust groove 40*c* may have a positional relation similar to the positional relation between the first exhaust groove 40*a* provided in the first main surface 11 of the metal terminal 10 and the conductive member 20 shown in FIGS. 4(*a*) to 4(*d*). Specifically, it is preferable that the third exhaust groove 40*c* is disposed around the conductive member 20, and a shortest distance D3 between the third exhaust groove 40*c* and the conductive member 20 is preferably 15 mm or less, more preferably 10 mm or less, most preferably 0 mm as described above. Furthermore, it is also preferable that the third exhaust groove 40*c* is disposed to be positioned between conductive members 20 and 20, in a case where a plurality of conductive members 20 are provided. Furthermore, the third exhaust groove 40*c* has a width that is, for example, from 0.05 to 5.0 mm, preferably from 0.2 to 3.0 mm, and has a depth that is, for example, from 0.01 to 2.0 mm, preferably from 0.02 to 1.0 mm.

Figure 8:
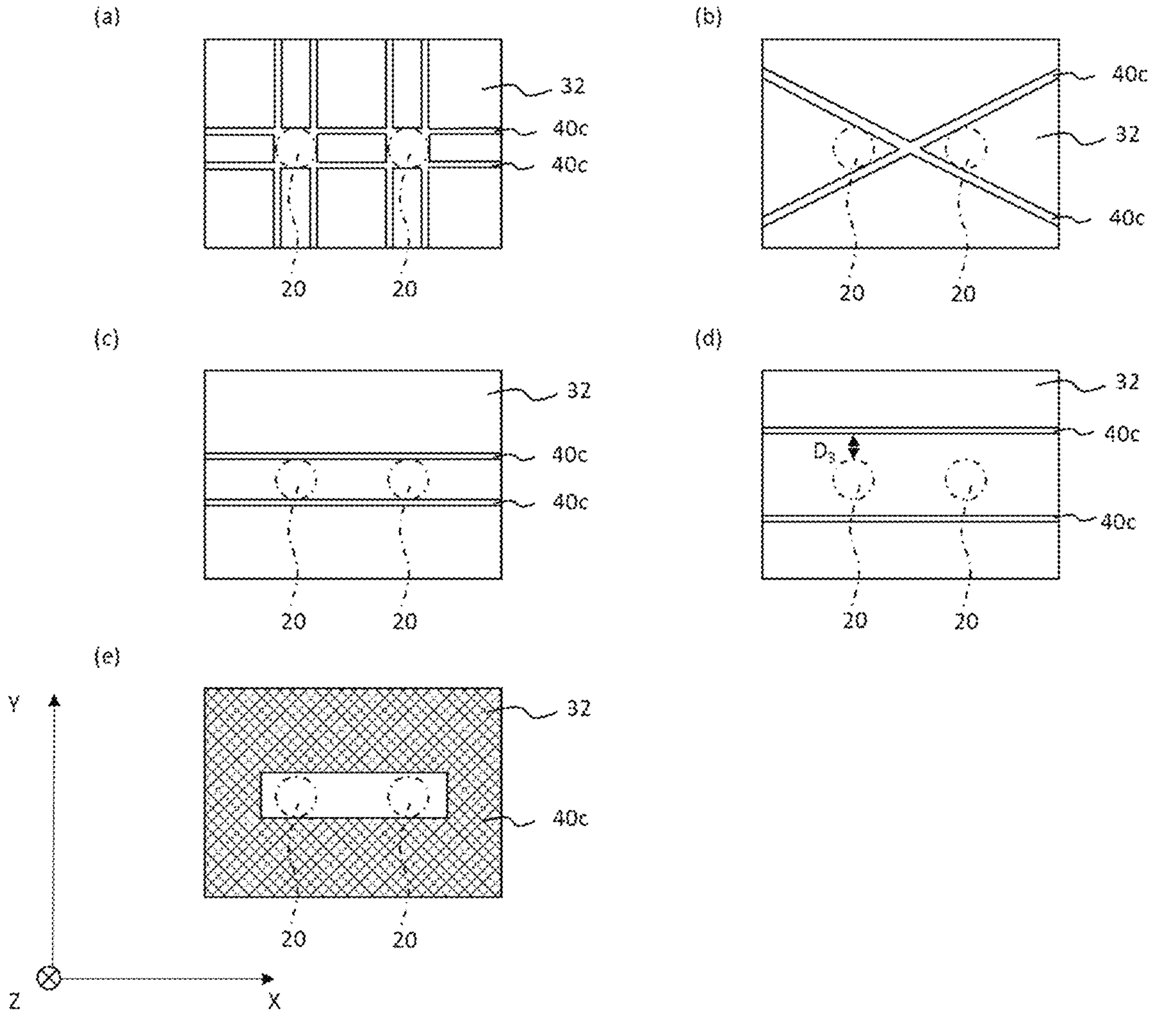
FIGS. 8(*a*) to 8(*e*) are plan views showing an exhaust path of the connection component according to the third embodiment.

More specifically, third exhaust grooves 40*c* may be arranged in a grid pattern, or an X-pattern in the second securing surface 32, or two third exhaust grooves 40*c* may be provided, and arranged in parallel with each other, as shown in FIGS. 8(*a*) to (*d*). Also, as shown in FIG. 8(*e*), a plurality of third exhaust grooves 40*c* are provided in the second securing surface 32, and arranged to cross one another, to form a large number of crossing grooves. In third exhaust grooves 40*c* shown in FIG. 8(*e*), a pitch between adjacent third exhaust grooves 40*c* is, for example, from 0.2 to 1.5 mm, preferably from 0.5 to 1.0 mm.

According to the connection component 1*c* and connection structure 2*c* of the third embodiment of the present invention, the third exhaust groove 40*c* is provided as the exhaust path 40 in the second securing surface 32 of the securing member 30, so that the bubble generated in the second securing surface 32 (i.e., an interface between the second securing surface 32 and the component 100 to be connected) can be suitably exhausted. In the connection component 1*c* and the connection structure 2*c*, the bubble is suitably exhausted, so that a metal terminal 10 can be securely and easily fixed to the component 100 to be connected in a state where the conductive member 20 is compressed, without any bubbles remaining in the securing member 30.

Fourth Embodiment

Figure 9:
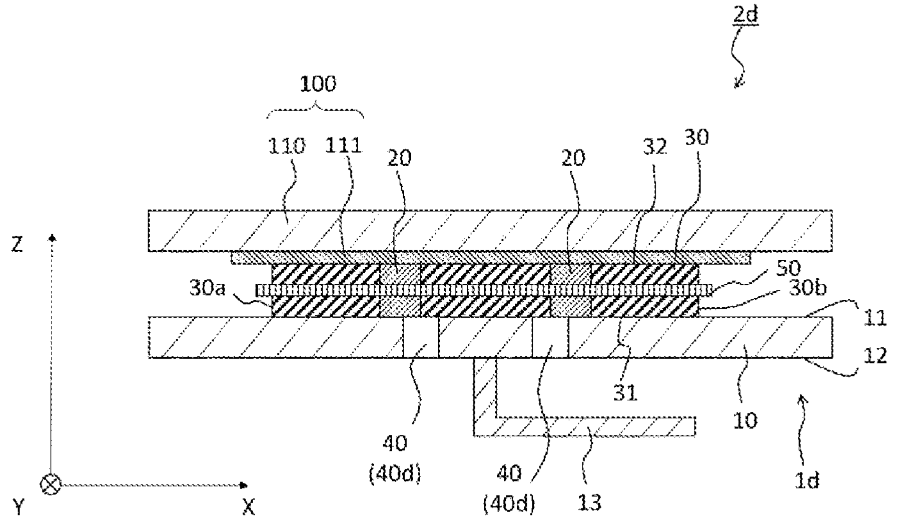
FIG. 9 is a cross-sectional view (No. 1) of a connection component and a connection structure according to a fourth embodiment.

A connection component 1*d* according to a fourth embodiment is different from the connection component 1*a* according to the first embodiment in that an exhaust path 40 comprises a first exhaust hole 40*d* extending through a first main surface 11 and a second main surface 12 in a metal terminal 10, as shown in FIG. 9. Hereinafter, differences of the fourth embodiment from the first embodiment will be described. Also, hereinafter, even in the description of the different embodiment, a member having the same configuration will be denoted with the same reference sign.

The exhaust path 40 in FIG. 9 is the first exhaust hole 40*d* extending through the first main surface 11 and the second main surface 12 in the metal terminal 10. When the first exhaust hole 40*d* has a structure of extending through the first main surface 11 and the second main surface 12 in the metal terminal 10, a bubble generated in a first securing surface 31 can be exhausted from a second main surface 12 side to outside air.

The first exhaust hole 40*d* as the exhaust path 40 can be formed by general metal processing such as milling, drilling, laser processing or the like.

It is preferable that the first exhaust hole 40*d* is disposed around a position to which a conductive member 20 is connected in the first main surface 11. Since the first exhaust hole 40*d* is disposed around the conductive member 20, a bubble generated in the first securing surface 31 around the conductive member 20 can be exhausted through the first exhaust hole 40*d*. A shortest distance $D_4$ between the first exhaust hole 40*d* and the conductive member 20 is preferably 15 mm or less, more preferably 10 mm or less, most preferably 0 mm, as described above. Specifically, as shown in FIG. 10(*a*), it is most preferable that the first exhaust hole 40*d* is in contact with the conductive member 20 in the first main surface 11.

Figure 10:
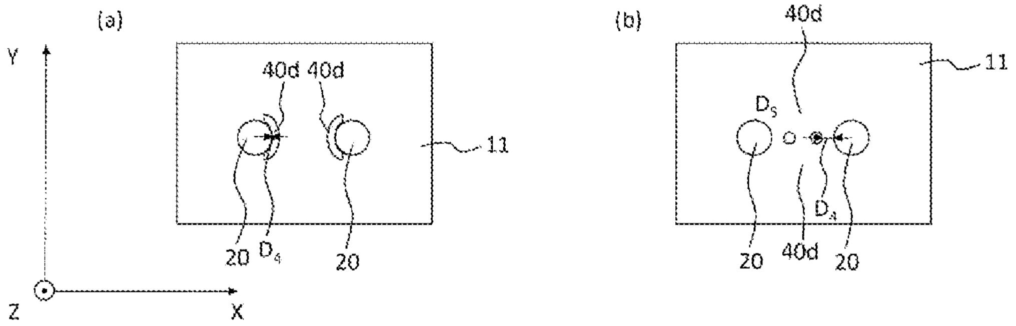
FIGS. 10(*a*) and 10(*b*) are plan views showing an exhaust path of the connection component according to the fourth embodiment.

Furthermore, it is also preferable that the first exhaust hole 40*d* (exhaust path 40) is disposed to be positioned between conductive members 20 and 20, as shown in FIGS. 10(*a*) and (*b*), in a case where a plurality of conductive members 20 are provided.

The first exhaust hole 40*d*, although not particularly limited, may have a diameter larger than, the same as, or smaller than a diameter of the conductive member 20, and preferably has the diameter smaller than that of the conductive member 20, from a viewpoint of strength of the metal terminal 10, or the like. The diameter of the first exhaust hole 40*d* is not particularly limited, and is, for example, from 0.01 to 5 mm, preferably from 0.02 to 4.0 mm.

Figure 11:
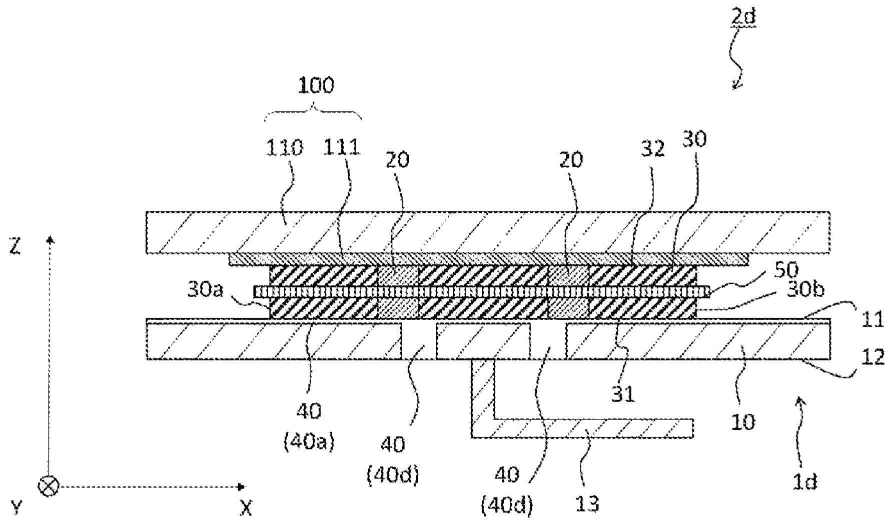
FIG. 11 is a cross-sectional view (No. 2) of the connection component and the connection structure according to the fourth embodiment.

The first exhaust hole 40*d* may be configured to communicate with the first exhaust groove 40*a* described in the first embodiment, as shown in FIG. 11. With the configuration where the first exhaust hole 40*d* communicates with the first exhaust groove 40*a*, a bubble generated in the first securing surface 31 of a securing member 30 can be suitably exhausted. Note that in a case where the first exhaust hole 40*d* and the first exhaust groove 40*a* are provided, it is only required that one of the shortest distance $D_1$ between the first exhaust groove 40*a* and the conductive member 20 and the shortest distance $D_4$ between the first exhaust hole 40*d* and the conductive member 20 is within the above range (i.e., a distance between the exhaust path 40 and the conductive member 20 may be 15 mm or less), and both of the distances are preferably within the above range. This also applies to another aspect where two or more types of exhaust paths are provided, as will be described below.

Figure 12:
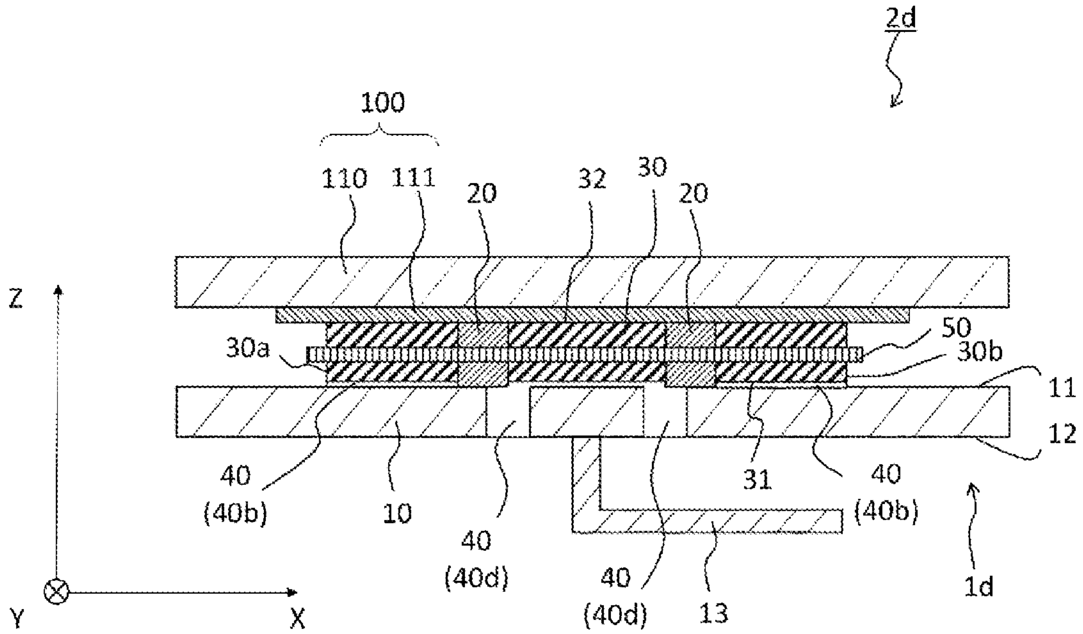
FIG. 12 is a cross-sectional view (No. 3) of the connection component and the connection structure according to the fourth embodiment.

Also, as shown in FIG. 12, the first exhaust hole 40*d* may be configured to communicate with the second exhaust groove 40*b* illustrated in the second embodiment. With the configuration where the first exhaust hole 40*d* communicates with the second exhaust groove 40*b*, a bubble generated in the first securing surface 31 of the securing member 30 can be more suitably exhausted.

To allow the first exhaust hole 40*d* to communicate with the first exhaust groove 40*a* or the second exhaust groove 40*b*, the first exhaust hole may be formed to overlap with a position where the first exhaust groove 40*a* or the second exhaust groove 40*b* is provided.

With the connection component 1*d* and a connection structure 2*d* of the fourth embodiment of the present invention, a bubble generated in the first securing surface 31 of the securing member 30 can be suitably exhausted by providing the first exhaust hole 40*d* extending through the first main surface 11 and the second main surface 12 in the metal terminal 10. In the connection component 1*d* and the connection structure 2*d*, when the bubble is suitably exhausted, the metal terminal 10 can be securely and easily fixed to a component 100 to be connected in a state where the conductive member 20 is compressed, without any bubbles remaining in the securing member 30.

Fifth Embodiment

Figure 13:
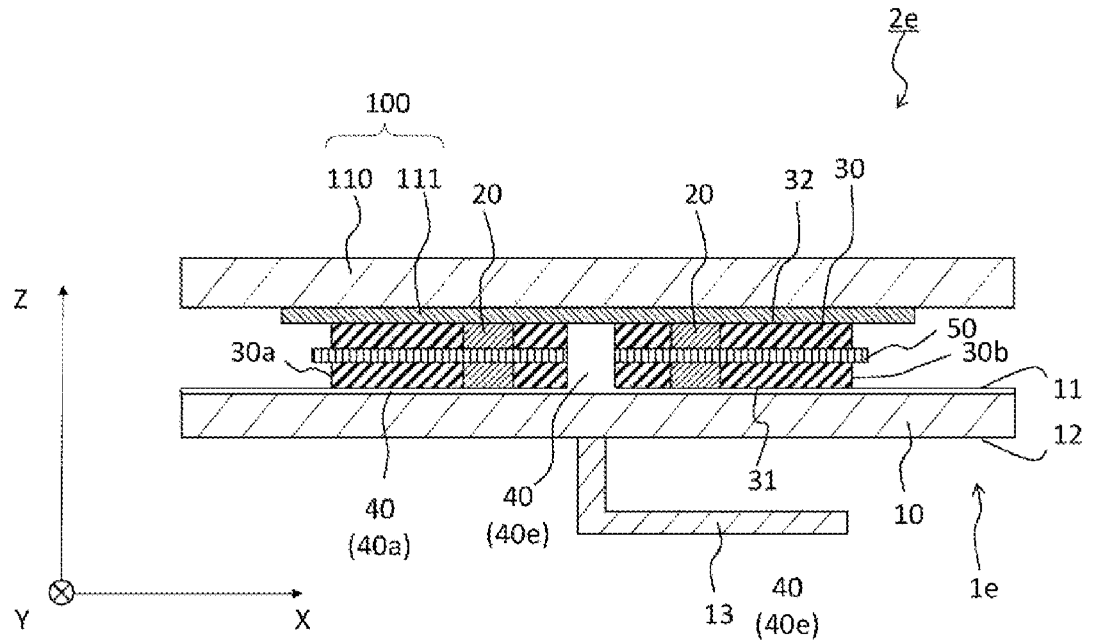
FIG. 13 is a cross-sectional view (No. 1) of a connection component and a connection structure according to a fifth embodiment.

A connection component 1*e* according to a fifth embodiment is different from the connection component 1*a* according to the first embodiment in that an exhaust path 40 comprises a second exhaust hole 40*e* extending through a first securing surface 31 and a second securing surface 32 in a securing member 30, as shown in FIG. 13. Hereinafter, differences of the fifth embodiment from the first embodiment will be described. Also, hereinafter, even in the description of the different embodiment, a member having the same configuration will be denoted with the same reference sign.

The second exhaust hole 40*e* also extends through a coupling member 50, in addition to the securing member 30. Specifically, the second exhaust hole 40*e* is a through hole extending through a first securing part 33, the coupling member 50, and a second securing part 34. As shown in FIG. 13, the second exhaust hole 40*e* may be configured to communicate with the first exhaust groove 40*a* illustrated in the first embodiment. With the configuration where the second exhaust hole 40*e* communicates with the first exhaust groove 40*a*, a bubble generated in the second securing surface 32 (an interface between the second securing surface 32 and a component 100 to be connected) can be exhausted to outside via the second exhaust hole 40*e* and the first exhaust groove 40*a*. Furthermore, a bubble generated in the first securing surface 31 (an interface between the first securing surface 31 and the first main plane 11) can be suitably exhausted via the first exhaust groove 40*a*.

Figure 14:
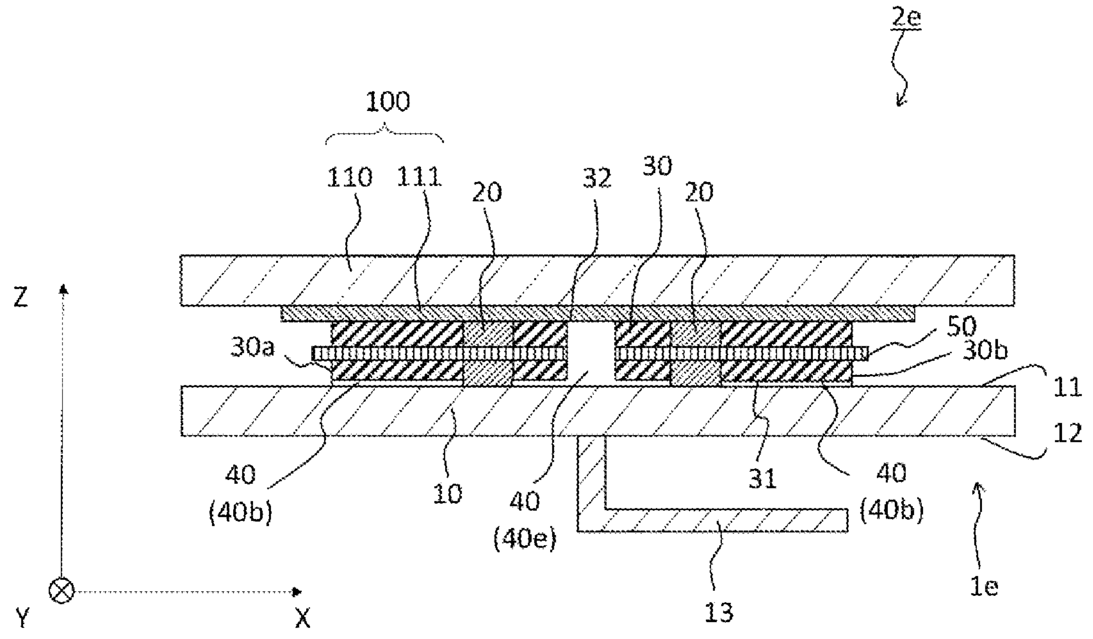
FIG. 14 is a cross-sectional view (No. 2) of the connection component and the connection structure according to the fifth embodiment.

As shown in FIG. 14, the second exhaust hole 40*e* may be configured to communicate with the second exhaust groove 40*b* illustrated in the second embodiment. With the configuration where the second exhaust hole 40*e* communicates with the second exhaust groove 40*b*, the bubble generated in the second securing surface 32 can be exhausted to outside via the second exhaust hole 40*e* and the second exhaust groove 40*b*. Also, the bubble generated in the first securing surface 31 can be exhausted to outside via the second exhaust groove 40*b*.

Figure 15:
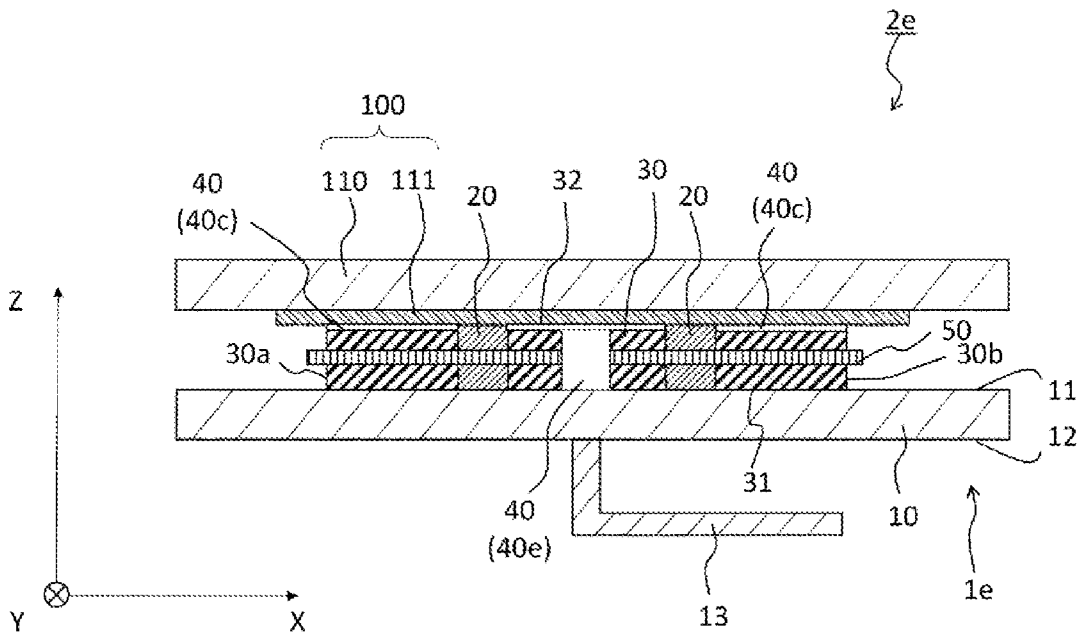
FIG. 15 is a cross-sectional view (No. 3) of the connection component and the connection structure according to the fifth embodiment.

Also, as shown in FIG. 15, the second exhaust hole 40*e* may be configured to communicate with the third exhaust groove 40*c* illustrated in the third embodiment. With the configuration where the second exhaust hole 40*e* communicates with the third exhaust groove 40*c*, a bubble generated in the second securing surface 32 (an interface between the second securing surface 32 and the component 100 to be connected) can be exhausted to outside via the third exhaust groove 40*c*. Also, the bubble generated in the first securing surface 31 of the securing member 30 (an interface between the first securing surface 31 and the first main plane 11) can be suitably exhausted via the second exhaust hole 40*e* and the like.

Figure 16:
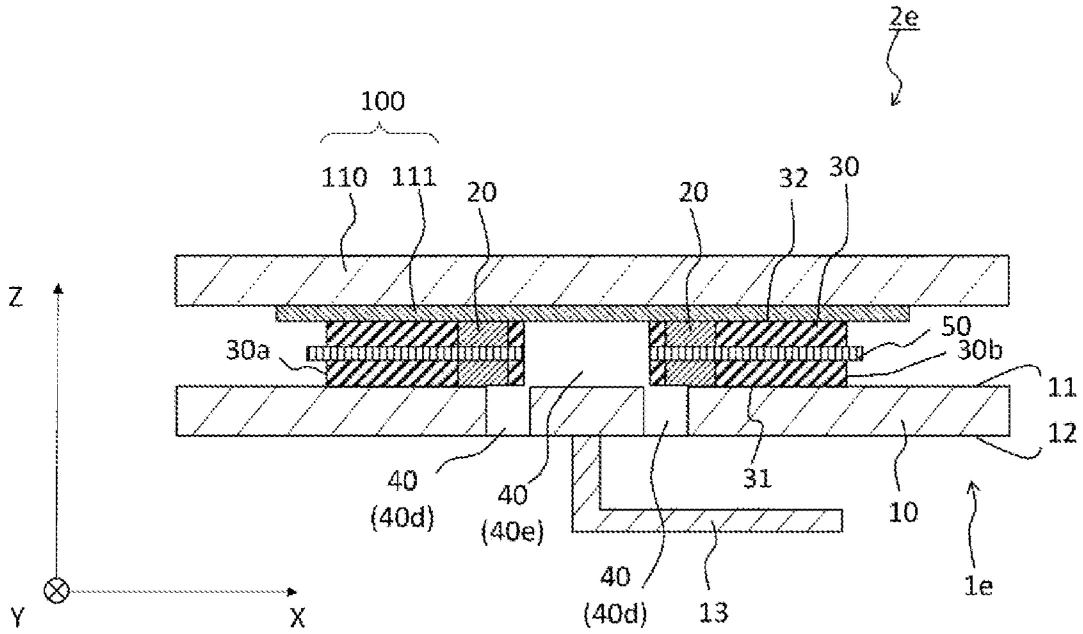
FIG. 16 is a cross-sectional view (No. 4) of the connection component and the connection structure according to the fifth embodiment.

Further, as shown in FIG. 16, the second exhaust hole 40*e* may be configured to communicate with the first exhaust hole 40*d* illustrated in the fourth embodiment. With the configuration where the second exhaust hole 40*e* communicates with the first exhaust hole 40*d*, the bubble generated in the first securing surface 31 of the securing member 30 can be exhausted to outside via the first exhaust hole 40*d* and the like. Also, the bubble generated in the second securing surface 32 can be suitably exhausted to outside via the first exhaust hole 40*d*, the second exhaust hole 40*e* and the like.

Description will be made as to the second exhaust hole 40*e* provided from the first securing surface 31 to the second securing surface 32 in the securing member 30, in more detail with reference to FIGS. 17(*a*) to 17(*d*).

Figure 17:
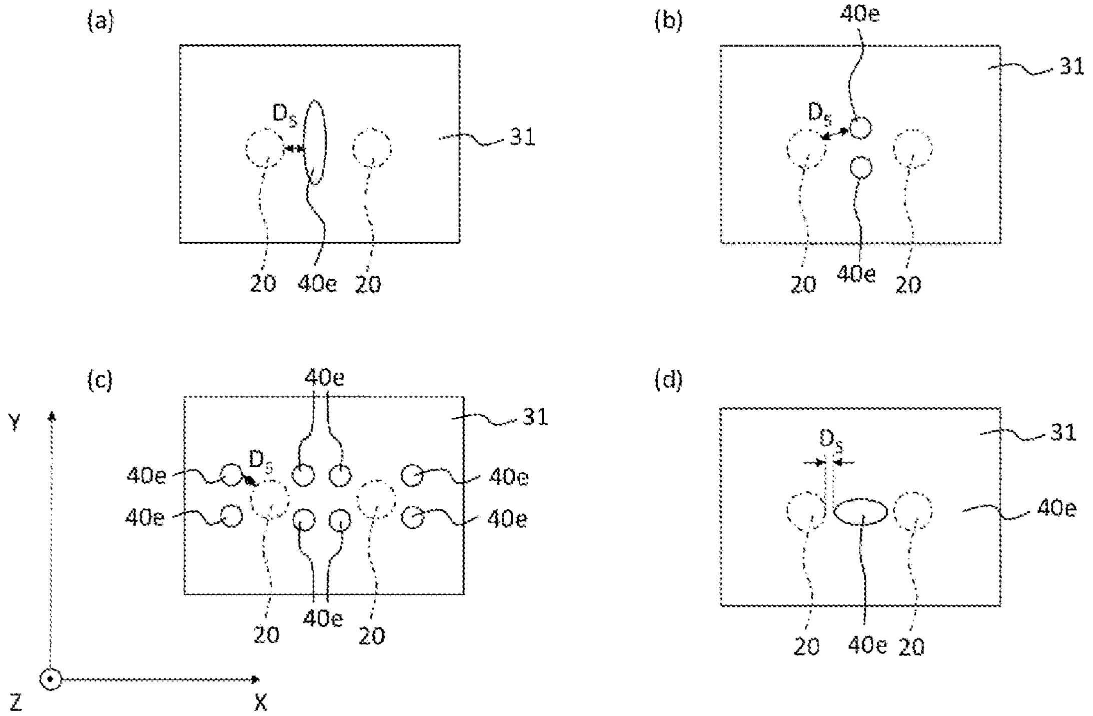
FIGS. 17(*a*) to 17(*d*) are plan views showing an exhaust path of the connection component according to the fifth embodiment.

As shown in FIGS. 17(*a*) to 17(*d*), it is preferable that the second exhaust hole 40*e* is disposed around a position to which a conductive member 20 is connected in the first main surface 11. Since the second exhaust hole 40*e* is disposed around the conductive member 20, bubbles generated in the first securing surface 31 and the second securing surface 32 around the conductive member 20 can be exhausted through the second exhaust hole 40*e*. A shortest distance $D_5$ between the second exhaust hole 40*e* and the conductive member 20 is preferably 15 mm or less, more preferably 10 mm or less as described above. Further, it is more preferable that the second exhaust hole 40*e* is not in contact with the conductive member 20, from a viewpoint of appropriately fixing the conductive member 20 with the securing member 30. Therefore, the shortest distance $D_5$ is preferably 0.1 mm or more, more preferably 0.5 mm or more.

Furthermore, it is also preferable that the second exhaust hole 40*e* is disposed to be positioned between conductive members 20 and 20, in a case where a plurality of conductive members 20 are provided. The second exhaust hole 40*e*, although not particularly limited, may have a diameter larger than, the same as, or smaller than a diameter of the conductive member 20. However, it is preferable that the second exhaust hole 40*e* has a diameter smaller than that of the conductive member 20, from a viewpoint of preventing adhesive strength of the securing member 30 from being decreased. The diameter of the second exhaust hole 40*e* is not particularly limited, and may be, for example, from 0.01 to 5 mm, preferably from 0.02 to 4 mm.

More specifically, as shown in FIGS. 17(*a*) and 17(*d*), the second exhaust hole 40*e* having the size larger than that of the conductive member 20 may be disposed between conductive members 20 or as shown in FIG. 17(*b*), a plurality of the second exhaust holes 40*e* may be arranged between the conductive members 20. Also, as shown in FIG. 17(*c*), a plurality of the second exhaust holes 40*e* may be arranged to surround the conductive member 20.

To communicate with the first exhaust groove 40*a*, the second exhaust groove 40*b*, the third exhaust groove 40*c*, or the first exhaust hole 40*d*, the second exhaust hole 40*e* may be formed to overlap with a position where each groove or hole is provided. The second exhaust hole 40*e* and the first exhaust hole 40*d* are allowed to communicate, for example, by combining the second exhaust hole 40*e* shown in FIG. 17(*d*) with the first exhaust hole 40*d* shown in FIGS. 10(*a*) and 10(*b*).

According to the connection component 1*e* and a connection structure 2*e* of the fifth embodiment of the present invention, the second exhaust hole 40*e* extending through the first securing surface 31 and the second securing surface 32 in the securing member 30 is provided, so that a bubble generated in at least one of the first securing surface 31 and the second securing surface 32 in the securing member 30 can be suitably exhausted. In the connection component 1*e* and the connection structure 2*e*, when the bubble is suitably exhausted, a metal terminal 10 can be securely and easily fixed to the component 100 to be connected in a state where the conductive member 20 is compressed, without any bubbles remaining in the securing member 30.

Note that in the above description of the fifth embodiment, the configuration is described where the exhaust path 40 comprises one of the first exhaust groove 40*a*, the second exhaust groove 40*b*, the third exhaust groove 40*c*, and the first exhaust hole 40*d*, in addition to the second exhaust hole 40*e*. However, the first exhaust groove 40*a*, the second exhaust groove 40*b*, the third exhaust groove 40*c* and the first exhaust hole 40*d* may not be provided, and the exhaust path 40 may comprise the second exhaust hole 40*e* alone.

Also, in a case where the exhaust path 40 comprises the second exhaust hole 40*e* alone, for example, in a case where the securing member 30 and the conductive member 20 are attached to the metal terminal 10 before secured to the component 100 to be connected, the bubble generated in the first securing surface 31 (i.e., an interface between the first securing surface 31 and the metal terminal 10) can be exhausted to outside via the second exhaust hole 40*e*.

Further, when the securing member 30 and the conductive member 20 are attached to the metal terminal 10 and then the securing member 30 and the conductive member 20 are attached to the component 100 to be connected, the second exhaust hole 40*e* does not communicate with outside. However, as will be described later, for example, in a sixth embodiment, a gas in the first or second securing surface 31 or 32 can be released into the second exhaust hole 40*e* by use of a volume difference in gas with temperature change.

Also, the second exhaust hole 40*e* is not limited to a hole in which a hollow space is present, and may be a notch extending from the first securing surface 31 to the second securing surface 32, and the second exhaust hole 40*e* may also include such a notch. Note that the first exhaust hole 40*d* may be a notch as well. The notch may be a notch with a substantially uniform width, or may be, for example, an elliptic notch with a varying width. The notch may have a length larger than a diameter of the first exhaust hole 40*d* or the second exhaust hole 40*e*. For example, the length may increase to about 4 mm to 10 mm, or may be long so as to reach an outer edge of the metal terminal 10 or the securing member 30.

Sixth Embodiment

Figure 18:
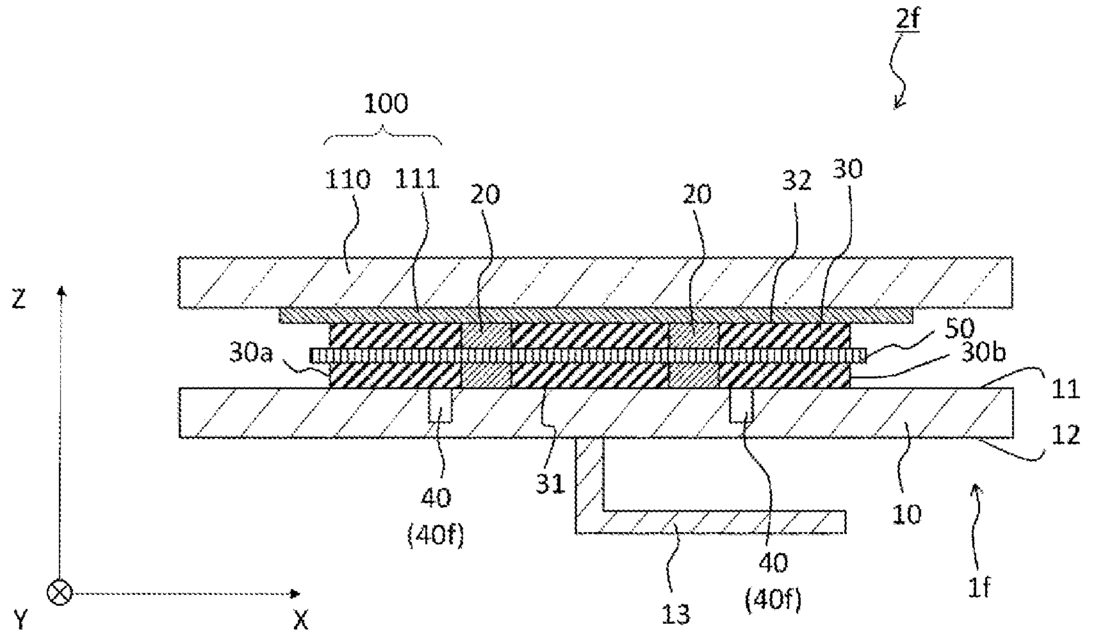
FIG. 18 is a cross-sectional view (No. 1) of a connection component and a connection structure according to a sixth embodiment.
Figure 19:
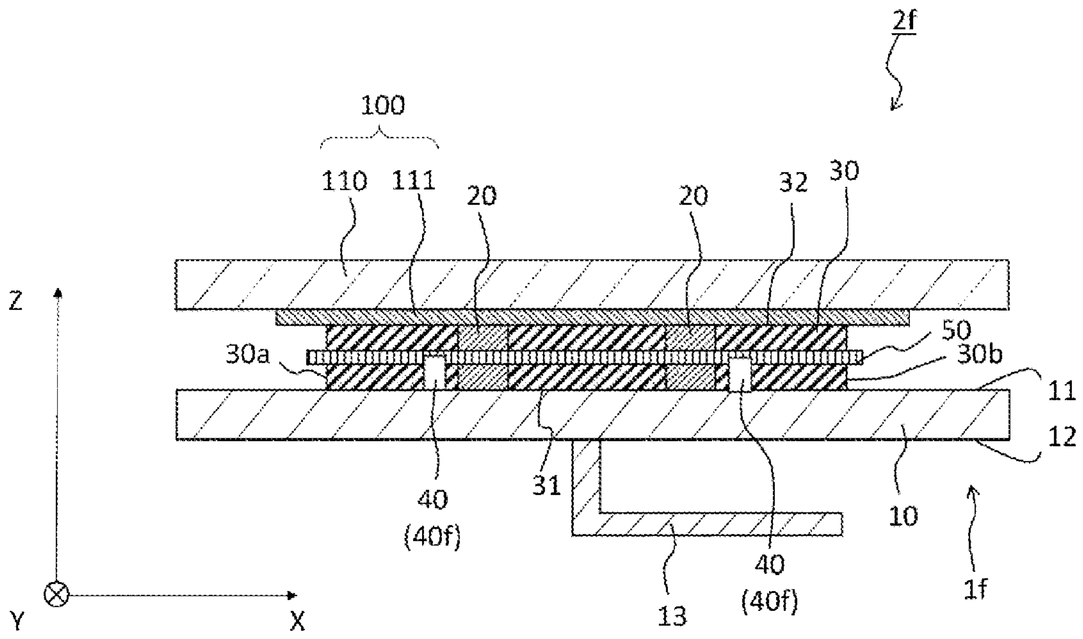
FIG. 19 is a cross-sectional view (No. 2) of the connection component and the connection structure according to the sixth embodiment.
Figure 20:
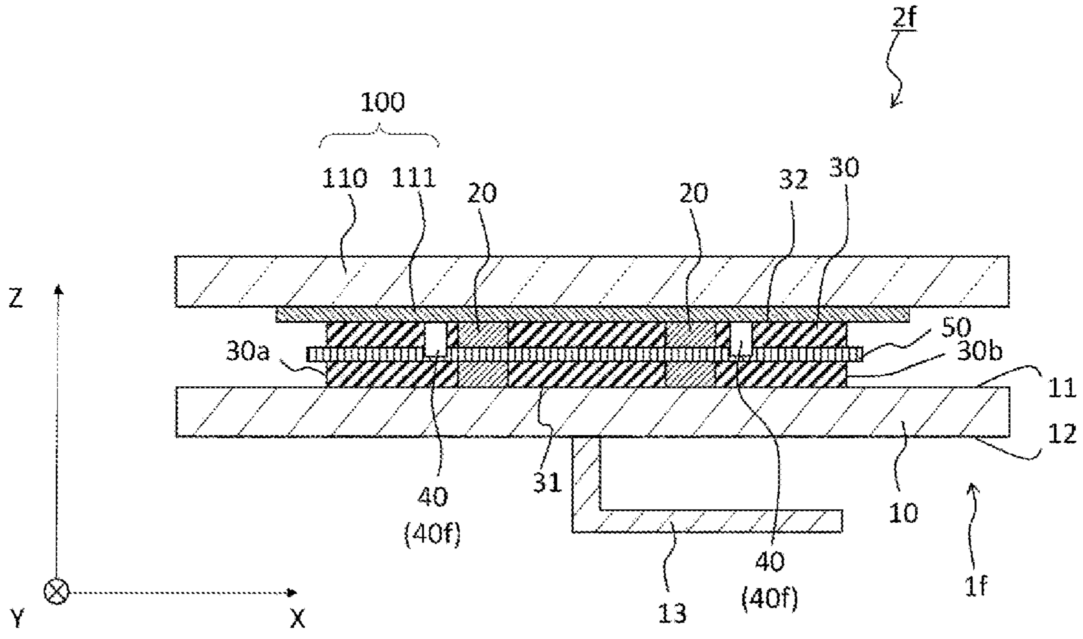
FIG. 20 is a cross-sectional view (No. 3) of the connection component and the connection structure according to the sixth embodiment.

A connection component if according to a sixth embodiment is different from the connection component 1*a* according to the first embodiment in that an exhaust path 40 is a bottomed hole 40*f*, as shown in FIGS. 18 to 20. Hereinafter, differences of the sixth embodiment from the first embodiment will be described. Also, hereinafter, even in the description of the different embodiment, a member having the same configuration will be denoted with the same reference sign.

The exhaust path 40 in FIG. 18 is a bottomed hole 40*f* provided in a first main surface 11 of a metal terminal 10. The exhaust path 40 in FIG. 19 is a bottomed hole 40*f* provided in a first securing surface 31 of a securing member 30. The bubble generated in the first securing surface 31 (i.e., an interface between the first securing surface 31 and the first main surface 11) can be kept inside the bottomed hole 40*f* in each of FIGS. 18 and 19.

The exhaust path 40 in FIG. 20 is a bottomed hole 40*f* provided in a second securing surface 32 of the securing member 30. A bubble generated in the second securing surface 32 (i.e., an interface between the second securing surface 32 and the component 100 to be connected) can be kept inside the bottomed hole 40*f* in FIG. 20.

Note that the bottomed hole 40*f* provided in the securing member 30 may extend through or does not have to extend through the coupling member 50, or may extend halfway through the coupling member 50. Furthermore, a surface of the coupling member 50 may form a bottom surface of the bottomed hole 40*f*.

A gas exists in advance in the bottomed hole 40*f*, and hence the bubble is kept inside by using a volume difference in gas. Specifically, when causing the securing member 30 to be bonded to the metal terminal 10 or the component 100 to be connected, the gas in the bottomed hole 40*f* is expanded by performing a heating treatment, and the gas in the bottomed hole 40*f* is then contracted by lowering a temperature to normal temperature, to make room in the bottomed hole 40*f*, so that the bubble can be kept inside.

The bottomed hole 40*f* as the exhaust path 40 may be formed by general metal processing such as milling or laser processing, and general resin processing such as laser processing. Also, for the securing member 30, the securing member 30 provided on a peeling sheet having a projection and depression shape of a hole is peeled from the peeling sheet, so that the securing member 30 comprising the bottomed hole 40*f* can be obtained.

According to the connection component if and a connection structure 2*f* of the sixth embodiment of the present invention, the bottomed hole 40*f* is provided in at least one of the metal terminal 10 and the securing member 30, so that a bubble generated in at least one of the first securing surface 31 and the second securing surface 32 in the securing member 30 can be suitably stored. In the connection component if and the connection structure 2*f*, when the bubble is suitably stored, the metal terminal 10 can be securely and easily fixed to the component 100 to be connected in a state where the conductive member 20 is compressed, without any bubbles remaining in the securing member 30.

Seventh Embodiment

Figure 21:
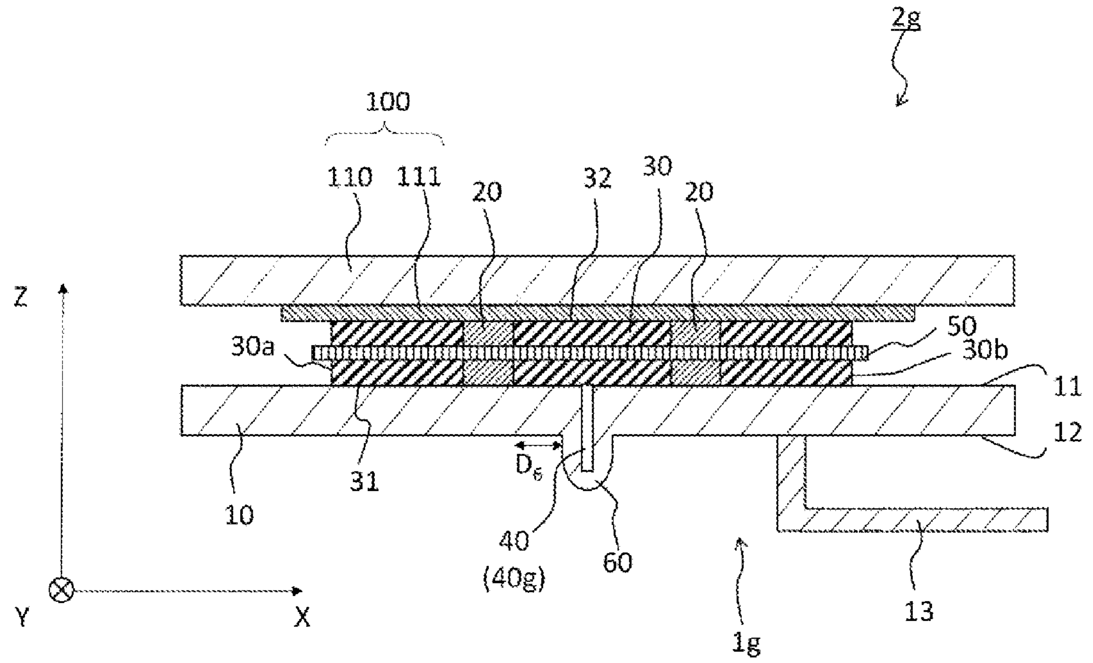
FIG. 21 is a cross-sectional view (No. 1) of a connection component and a connection structure according to a seventh embodiment.

A connection component 1*g* according to a seventh embodiment is different from the connection component 1*a* according to the first embodiment in that a second main surface 12 of a metal terminal 10 comprises a projection 60, as shown in FIG. 21. Hereinafter, differences of the seventh embodiment from the first embodiment will be described. Also, hereinafter, even in the description of the different embodiment, a member having the same configuration will be denoted with the same reference sign.

In the present embodiment, as shown in FIG. 21, the connection component 1*g* may be provided with the projection 60, and an interior of the projection 60 may be provided with an exhaust groove 40*g* (first exhaust groove). The exhaust groove 40*g* may form at least a part of the first exhaust groove provided in the first main surface 11 of the metal terminal 10.

In a case where the metal terminal 10 is provided with the projection 60, pressure acts on and in the vicinity of the projection 60, when a conductive member 20 is fixed to the metal terminal 10 with a securing member 30, while supporting the projection 60. Consequently, a bubble generated when the securing member 30 is bonded to the metal terminal 10 can be efficiently discharged to outside via an exhaust path 40 such as the exhaust groove 40*g*.

Figure 22:
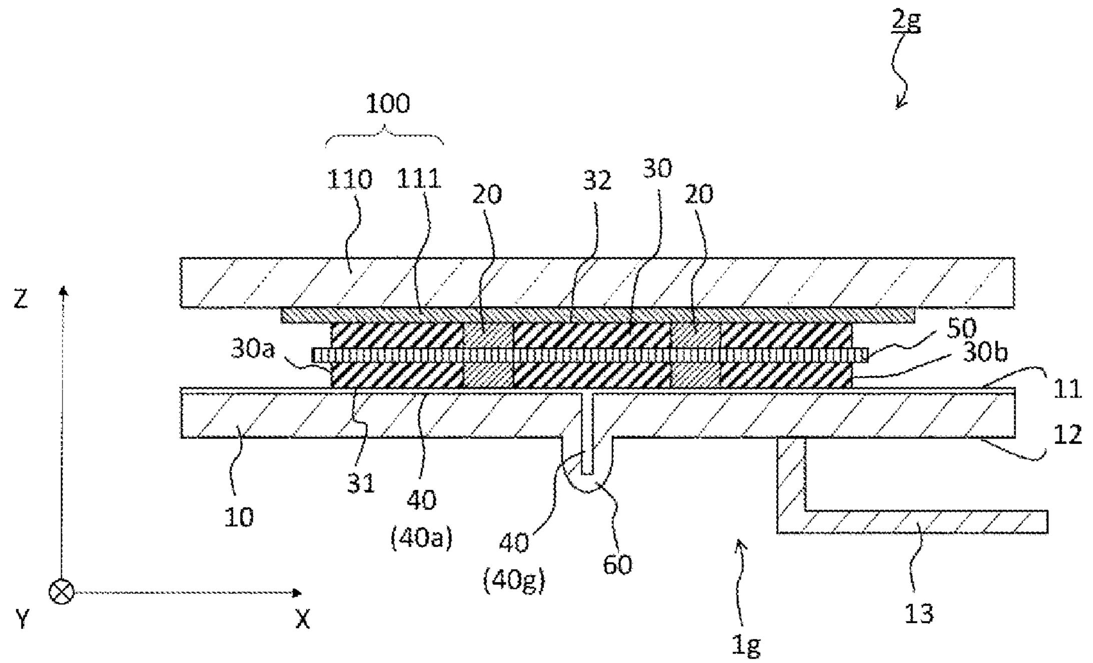
FIG. 22 is a cross-sectional view (No. 2) of the connection component and the connection structure according to the seventh embodiment.
Figure 23:
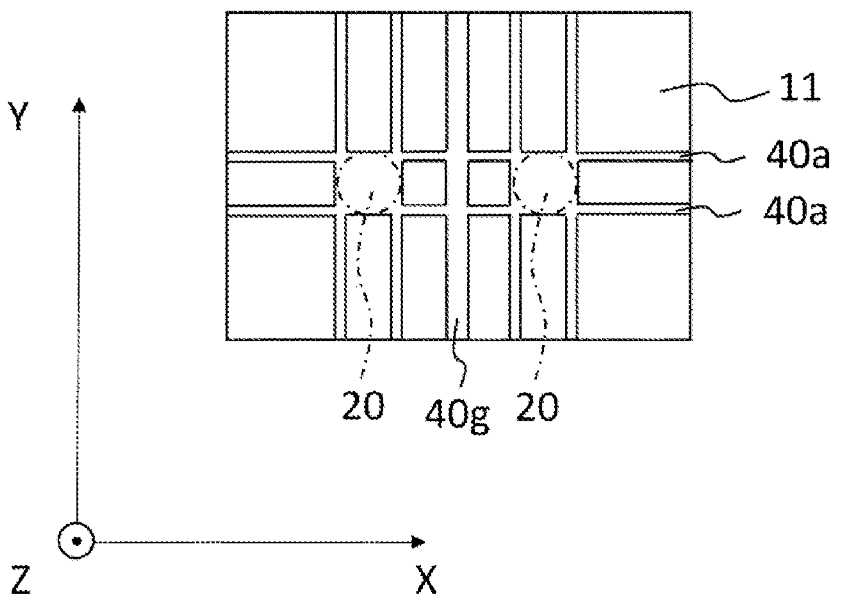
FIG. 23 is a plan view showing an exhaust path of the connection component according to the seventh embodiment.

Note that in the case where the projection 60 is provided, an exhaust groove to be provided in the metal terminal 10 may be the exhaust groove 40*g* provided in the interior of the projection 60 alone, as shown in FIG. 21, but as shown in FIG. 22, an exhaust groove (first exhaust groove) may be provided in a portion other than the interior of the projection 60 as well. Exhaust grooves (exhaust grooves 40*a*) in a portion other than the interior of the projection 60 may be arranged in arrangement patterns as shown in FIGS. 4(*a*) to 4(*d*) in the same manner as in the first embodiment. FIG. 23 shows, for example, an aspect in a case where the exhaust grooves 40*a* are arranged in a grid pattern shown in FIG. 4(*a*). When exhaust grooves are provided both in the interior of the projection 60 and a portion other than the interior of the projection 60, a bubble formed in a first securing surface 31 of the securing member 30 can be more efficiently exhausted to outside.

It is preferable that the projection 60 is provided in a portion corresponding to a portion where a bubble is easily generated in the securing member 30. That is, it is preferable to provide the projection 60 in the vicinity of a position where the conductive member 20 is disposed and thus a bubble is easily generated. Specifically, a shortest distance $D_6$ between the projection 60 and the conductive member 20 in planar view in a thickness direction (see FIG. 21) is preferably 10 mm or less, more preferably 5 mm or less. Also, it is preferable that the projection 60 and the conductive member 20 are separated from each other, and the shortest distance $D_6$ may be, for example, 0.01 mm or more, preferably 0.1 mm or more.

Figure 24:
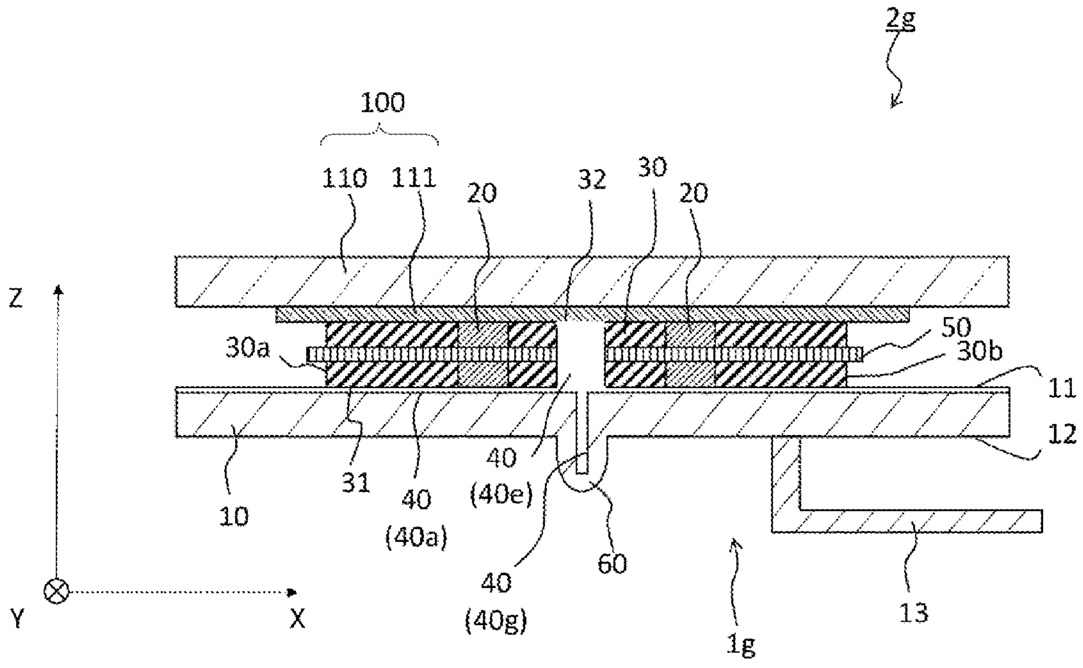
FIG. 24 is a cross-sectional view (No. 3) of the connection component and the connection structure according to the seventh embodiment.

Also, in the case where the projection 60 is provided, a second exhaust groove 40*b* (see FIGS. 6(*a*) to 6(*e*)) to be formed in a first adhering surface may be formed in place of the first exhaust groove, or an exhaust path such as a first exhaust hole 40*d* (see FIGS. 10(*a*) and 10(*b*)) or a second exhaust hole 40*e* (see FIGS. 17(*a*) to 17(*d*)) may be suitably formed. Needless to say, two types or more of the first exhaust groove 40*a*, the second exhaust groove 40*b*, a third exhaust groove 40*c*, the first exhaust hole 40*d* and the second exhaust hole 40*e* may be suitably combined. For example, as shown in FIG. 24, the first exhaust groove 40*a* and the second exhaust hole 40*e* may be combined. In this case, the second exhaust hole 40*e* may communicate with the exhaust groove 40*g* provided in the interior of the projection 60.

Figure 25:
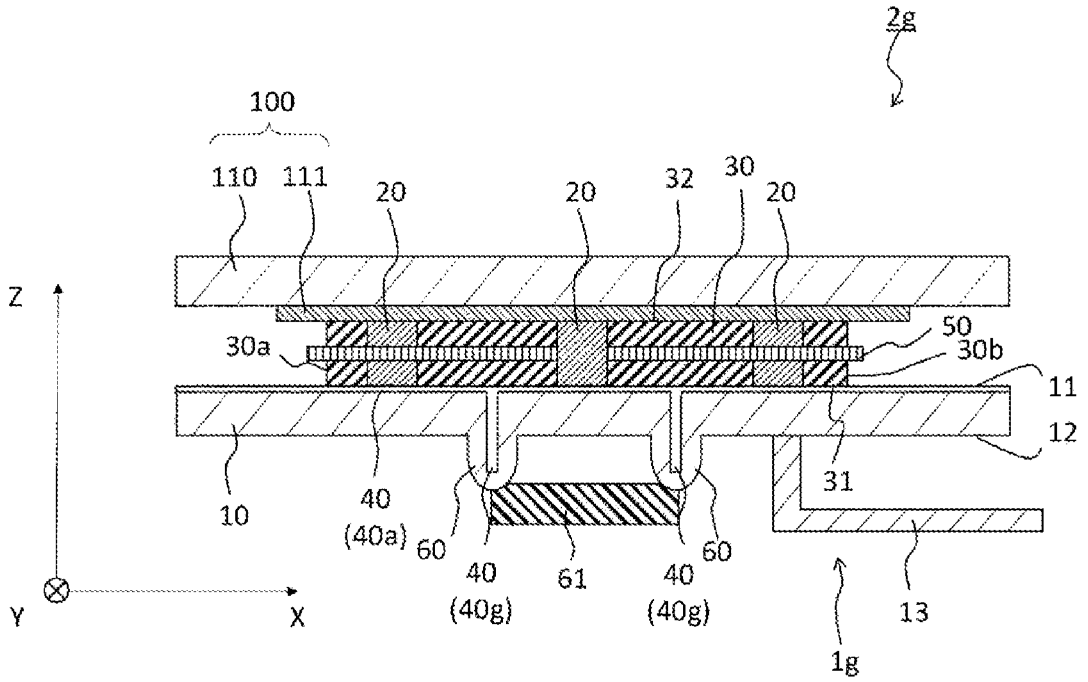
FIG. 25 is a cross-sectional view (No. 4) of the connection component and the connection structure according to the seventh embodiment.

The number of projections 60 may be one as shown in FIGS. 21 to 24, or may be more than one as shown in FIG. 25. From a viewpoint of efficiently exhausting a bubble generated around the conductive member 20, it is preferable that the number of the projections 60 corresponding to the number of arranged conductive members 20 are provided in accordance with portions where the conductive members 20 are arranged. Also, in a case where a plurality of projections are arranged, projections may be coupled to each other by a connecting member 61 as shown in FIG. 25. When the projections are coupled by the connecting member 61, the securing member 30 is bonded to the metal terminal 10, while supporting the connecting member 61, so that pressure can act on vicinities of the plurality of projections 60 at once.

Figure 26:
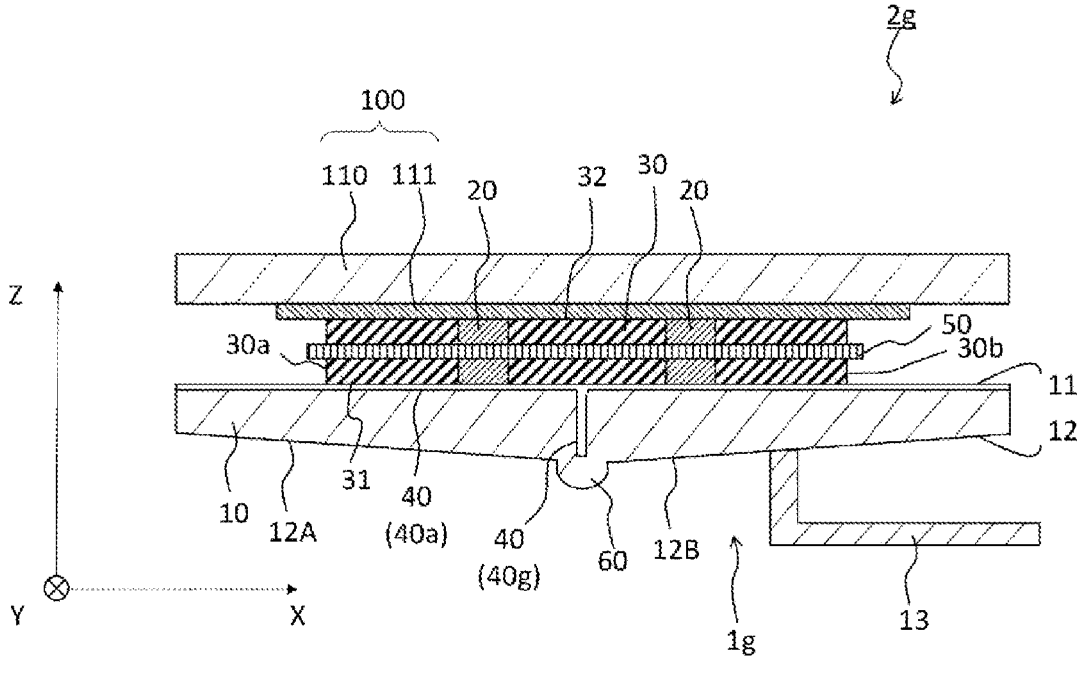
FIG. 26 is a cross-sectional view (No. 5) of the connection component and the connection structure according to the seventh embodiment.

Furthermore, the metal terminal 10 does not have to be a flat plate. For example, the second main surface 12 that is an opposite surface to the first main surface 11 may consist of a combination of inclined surfaces. For example, as shown in FIG. 26, the second main surface 12 may comprise a first inclined surface 12A and a second inclined surface 12B that are farther from the first main plane 11 as being closer to a central projection 60. Additionally, also, in the above first to sixth embodiments, the metal terminal 10 does not have to be a flat plate. For example, the second main surface 12 may consist of a combination of inclined surfaces.

The metal terminal 10 comprising the projection 60 may be formed by bending, casting or the like. For example, in bending, the exhaust groove 40*g* reaching an edge of the metal terminal 10 can be formed in the interior of the projection 60 only by bending a plate for forming the metal terminal, as shown in FIGS. 21 to 25. Also, the metal terminal 10 having a shape other than a flat plate shape can be easily formed by casting, as shown in FIG. 26.

According to the connection component 1*g* and a connection structure 2*g* of a seventh embodiment of the present invention, the second main surface 12 of the metal terminal 10 comprises the projection 60, so that the bubble generated in the securing member 30 can be suitably exhausted. In the connection component 1*g* and the connection structure 2*g*, when the bubble is suitably exhausted, the metal terminal 10 can be securely and easily fixed to a component 100 to be connected in a state where the conductive member 20 is compressed, without any bubbles remaining in the securing member 30.

Eighth Embodiment

Figure 27:
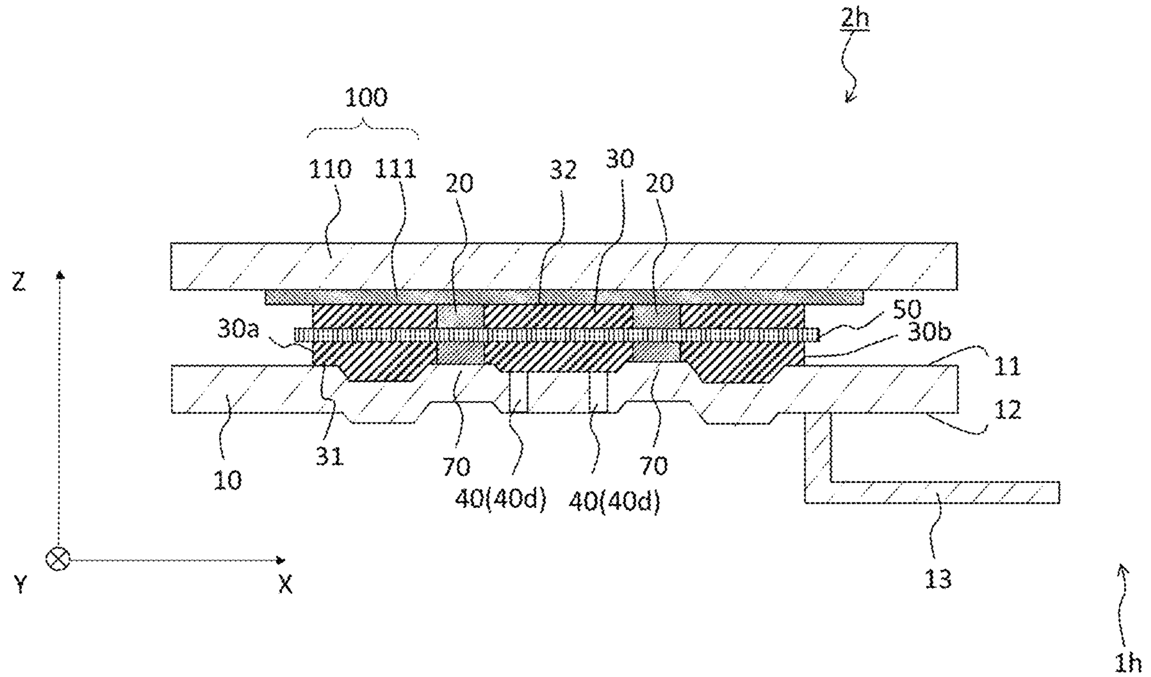
FIG. 27 is a cross-sectional view of a connection component and a connection structure according to an eighth embodiment.

A connection component 1*h* according to an eighth embodiment is different from the connection component according to each of the above embodiments in that a first main surface 11 of a metal terminal 10 comprises a portion in contact with a conductive member 20, the portion being in a projection shape 70, as shown in FIG. 27. Hereinafter, differences of the eighth embodiment from the first embodiment will be described. Also, hereinafter, even in the description of the different embodiment, a member having the same configuration will be denoted with the same reference sign.

The projection shape 70 is a projecting portion with a vertex being the portion in contact with the conductive member 20 in the first main surface 11 of the metal terminal 10. The projecting portion 70 is a starting point to press the conductive member 20, when the connection component 1*h* is attached to a component 100 to be connected. Therefore, when pressing from a second main surface 12 side of the connection component 1*h*, pressure concentrates on the projecting portion 70, and the conductive member 20 can be easily pressed against the component 100 to be connected. Consequently, the conductive member 20 can be appropriately compressed, and thus the connection component 1*h* can be firmly and easily secured to the component 100 to be connected.

The number of projecting portions 70 may be one or more. From a viewpoint of keeping the conductive member 20 in a compressed state efficiently, it is preferable that the number of the projecting portions 70 corresponding to the number of arranged conductive members 20 are provided in accordance with portions where the conductive members 20 are arranged.

A shape of the projecting portion 70 is not particularly limited, and the projecting vertex may be planar as shown in FIG. 27, or the projecting vertex may be curved. The projecting portion 70 may be formed by bending, casting or the like.

Also, in a case where the projection shape 70 is provided, it is only required that one of the above exhaust paths 40 is provided. For example, FIG. 27 shows a configuration where the metal terminal 10 is provided with a first exhaust hole 40*d*, but any form may be adopted as long as at least one of the first exhaust hole 40*d*, a second exhaust hole 40*e*, and first to third exhaust grooves 40*a*, 40*b* and 40*c* is provided.

According to the connection component 1*h* and a connection structure 2*h* of the eighth embodiment of the present invention, when the first main surface 11 of the metal terminal 10 comprises the projecting portion 70, the conductive member 20 can be easily in a compressed state. Also, a bubble can be exhausted through an exhaust path 40 without remaining in a securing member 30.

Other Embodiments

Figure 28:
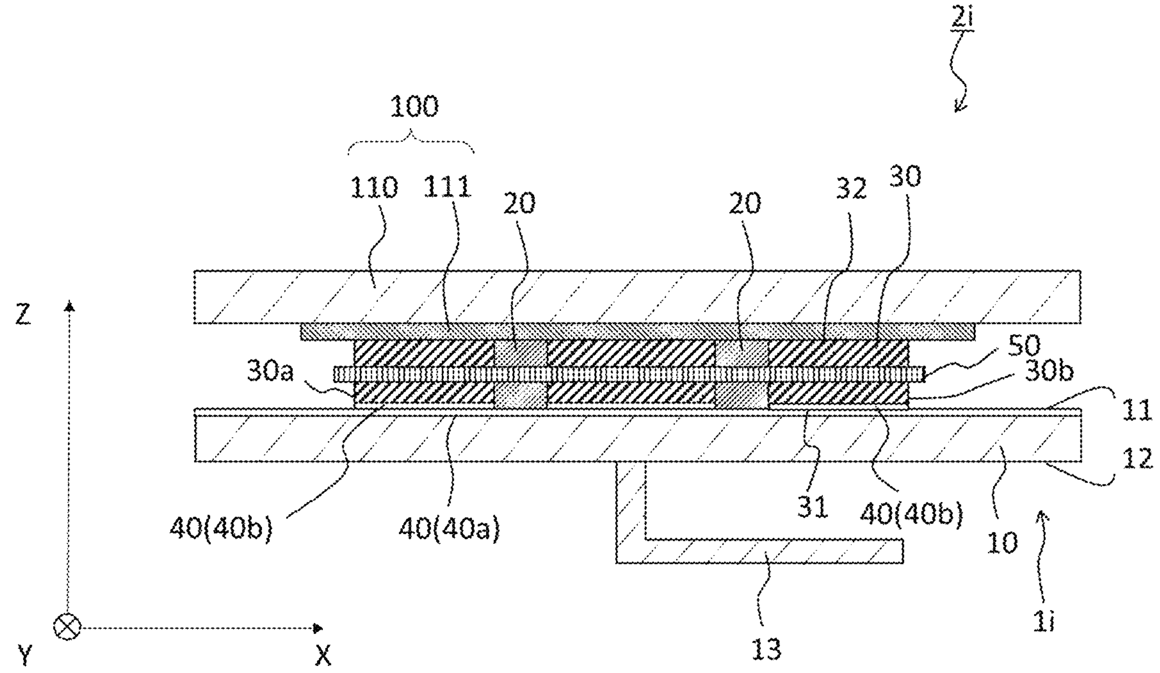
FIG. 28 is a cross-sectional view (No. 1) of a connection component and a connection structure according to one other embodiment.
Figure 29:
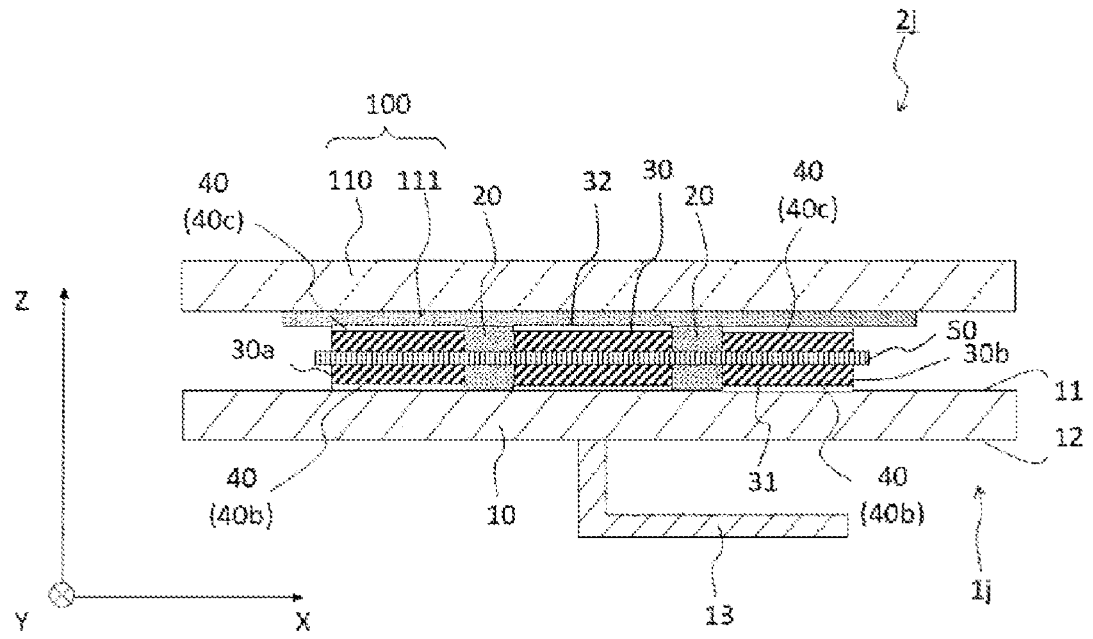
FIG. 29 is a cross-sectional view (No. 2) of the connection component and the connection structure according to the one other embodiment.

The above description illustrates examples where as the exhaust path 40, the first exhaust groove 40*a* (first embodiment), the second exhaust groove 40*b* (second embodiment), the third exhaust groove 40*c* (third embodiment), the first exhaust hole 40*d* (fourth embodiment), the second exhaust hole 40*e* (fifth embodiment) and the bottomed hole 40*f* (sixth embodiment) are provided, and they may be suitably combined. For example, as in a connection component 1*i* and a connection structure 2*i* shown in FIG. 28, the first exhaust groove 40*a* (first embodiment) and the second exhaust groove 40*b* (second embodiment) may be combined. Further, as in a connection component 1*j* and a connection structure 2*j* shown in FIG. 29, the second exhaust groove 40*b* (second embodiment) and the third exhaust groove 40*c* (third embodiment) may be combined.

Further, there are separately illustrated a form (seventh embodiment) where the second main surface 12 of the metal terminal 10 comprises the projection 60 and a form (eighth embodiment) where the first main surface 11 of the metal terminal 10 has the projection shape 70, and these forms may be combined.

Specifically, the respective embodiments described above may be suitably combined, and all the embodiments may be combined, too.

Furthermore, in the above respective embodiments, the coupling member 50 couples the securing member 30 and the conductive member 20, but the coupling member 50 may be omitted. In a case where the coupling member 50 is omitted, the securing member 30 is directly bonded to the conductive member 20, so that the conductive member 20 and the securing member 30 may be integrated. However, the securing member 30 and the conductive member 20 do not necessarily have to be integrated. For example, the conductive member 20 and the securing member 30 may be separately attached to the metal terminal 10 to produce a connection component.

EXAMPLES

The present invention will be described in more detail with reference to examples, but the present invention is not limited to these examples.

Example 1

Two conductive members 20 each having a diameter of 2.0 mm and a height (thickness) of 0.7 mm were coupled by a PET film (coupling member 50) with a thickness of 100 μm. Each conductive member 20 comprised the conductive part 21 and the insulation part 22 shown in FIG. 3. On each of opposite surfaces of the coupling member 50, a pressure-sensitive adhesive layer (securing member 30) was laminated, the layer being made of an acrylic pressure-sensitive adhesive and having a thickness of 200 μm. A first securing surface 31 of the securing member 30 was bonded to a metal terminal 10, to obtain a connection component 1*a* shown in FIG. 1. Note that the metal terminal 10 comprised, in a first main surface 11, first exhaust grooves 40*a* with a pattern shown in FIG. 4(*a*). Each first exhaust groove 40*a* had a width of 3.0 mm and a depth of 0.05 mm. Next, the connection component 1*a* was fixed, via a second securing surface 32, to a glass plate (member 110 to be connected) comprising a power feeding part 111, to obtain a connection structure 2*a* shown in FIG. 2.

Examples 2 and 3

The same procedure as in Example 1 was conducted except that a shape of the first exhaust groove 40*a* was changed as shown in Table 1.

Example 4

The same procedure as in Example 1 was conducted except that in place of the first exhaust groove 40*a*, a first exhaust hole 40*d* was provided in a pattern shown in Table 1 in the metal terminal 10. The first exhaust hole 40*d* had a diameter of 2.0 mm.

Example 5

The same procedure as in Example 1 was conducted except that in addition to the first exhaust groove 40*a*, a first exhaust hole 40*d* was provided in a pattern shown in Table 1 in the metal terminal 10. The first exhaust hole 40*d* had a diameter of 2.0 mm.

Examples 6 to 8

The same procedure as in Example 1 was conducted except that in addition to the first exhaust groove 40*a*, a second exhaust hole 40*e* was provided in a pattern shown in Table 1 in the securing member 30. In Example 6, the second exhaust hole 40*e* had a major diameter of 5.0 mm and a minor diameter of 1.5 mm. In Examples 7 and 8, the second exhaust holes 40*e* had diameters of 1.5 mm and 1.5 mm, respectively.

Example 9

The same procedure as in Example 1 was conducted except that in place of the first exhaust groove 40*a*, a first exhaust hole 40*d* was provided in the metal terminal 10 and a second exhaust hole 40*e* was provided in the securing member 30, in patterns shown in Table 2. The first exhaust hole 40*d* had a diameter of 2.0 mm. The second exhaust hole 40*e* had a major diameter of 3.0 mm and a minor diameter of 1.5 mm.

Examples 10 and 11

The same procedure as in Example 1 was conducted except that metal terminals 10 were used, the metal terminals 10 comprising projections 60 shown in FIGS. 22 and 26, respectively, each metal terminal 10 being provided with the first exhaust grooves 40*a*, respectively, in patterns shown in Table 2. An exhaust groove 40*g* in the interior of each projection 60 had a width of 3.0 mm.

Example 12

The same procedure as in Example 1 was conducted except that a metal terminal was used, the metal terminal comprising a projection 60 shown in FIG. 24, the metal terminal being provided with first exhaust grooves 40*a* in a pattern shown in Table 2, and except that the securing member 30 was provided with a second exhaust hole 40*e*. An exhaust groove 40*g* in the interior of the projection 60 had a width of 3.0 mm.

Example 13

The same procedure as in Example 1 was conducted except that in place of the first exhaust groove 40*a*, second exhaust grooves 40*b* were provided in a pattern shown in Table 2 in the securing member 30. Each second exhaust groove 40*b* had a width of 0.075 mm and a depth of 0.025 mm, and a pitch between adjacent grooves was 0.710 mm.

Example 14

The same procedure as in Example 1 was conducted except that in addition to first exhaust grooves 40*a*, second exhaust grooves 40*b* were provided in a pattern shown in Table 2 in the securing member 30. Each second exhaust groove 40*b* had a width of 0.075 mm and a depth of 0.025 mm, and a pitch between adjacent grooves was 0.710 mm.

Example 15

The same procedure as in Example 1 was conducted except that in place of the first exhaust groove 40*a*, third exhaust grooves 40*c* were provided in a pattern shown in Table 2 in the securing member 30. Each third exhaust groove 40*c* had a width of 0.075 mm and a depth of 0.025 mm, and a pitch between adjacent grooves was 0.710 mm.

Example 16

The same procedure as in Example 1 was conducted except that in addition to first exhaust grooves 40*a*, third exhaust grooves 40*c* were provided in a pattern shown in Table 2 in the securing member 30. Each third exhaust groove 40*c* had a width of 0.075 mm and a depth of 0.025 mm, and a pitch between adjacent grooves was 0.710 mm.

Comparative Example 1

The same procedure as in Example 1 was conducted except that an exhaust path was not provided.

(Evaluation Criteria)

In each of the connection structures obtained in the respective examples and the comparative example, a bubble generation state was examined in a first adhering surface (an interface between the first adhering surface and a first main surface) and a second adhering surface (an interface between the second adhering surface and an adherend component), and performances of connection components and the connection structures were evaluated. Table 1 shows the results. Note that signs used in the evaluation result shown in Table 1 indicate the following meanings.

A: Cells were substantially completely removed from near a conductive member in each of the first adhering surface and the second adhering surface.

B1: In the first adhering surface, a bubble mass near the conductive member was substantially removed and reduced in size. Also, in the second adhering surface, a bubble mass near the conductive member was substantially removed and reduced in size.

B2: A bubble near the conductive member in the first adhering surface was substantially completely removed. On the other hand, a bubble mass in the second adhering surface was not removed.

B3: A bubble near the conductive member in the second adhering surface was substantially completely removed. On the other hand, a bubble mass in the first adhering surface was not removed.

C: Cell masses in the first and second adhering surfaces were not removed.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Sectional structure | FIGS. 1, 2 | FIGS. 1, 2 | FIGS. 1, 2 | FIG. 9 | FIG. 11 | FIG. 13 | FIG. 13 | FIG. 13 |
| First exhaust groove (Metal terminal) | FIG. 4(a) | FIG. 4(b) | FIG. 4(c) | | FIG. 4(a) | FIG. 4(a) | FIG. 4(a) | FIG. 4(a) |
| Distance $D_1$ (mm) | 0 | 0 | 0 | | 0 | 0 | 0 | 0 |
| First exhaust hole (Metal terminal) | | | | FIG. 10(a) | FIG. 10(b) | | | |
| Distance $D_4$ (mm) | | | | 0 | 0.4 | | | |
| Second exhaust hole (Securing member) | | | | | | FIG. 17(a) | FIG. 17(b) | FIG. 17(c) |
| Distance $D_5$ (mm) | | | | | | 1.6 | 1.6 | 0.4 |
| Metal terminal | Flat plate | Flat plate | Flat plate | Flat plate | Flat plate | Flat plate | Flat plate | Flat plate |
| Cell removal determination | B2 | B2 | B2 | B2 | B2 | B1 | B1 | B1 |

TABLE 2

| | Ex. 9 | Ex. 10 | Ex. 11 | Ex. 12 | Ex. 13 | Ex. 14 | Ex. 15 | Ex. 16 | Com. Ex. 1 |
|---|---|---|---|---|---|---|---|---|---|
| Sectional structure | FIG. 16 | FIG. 22 | FIG. 26 | FIG. 24 | FIG. 5 | FIG. 28 | FIG. 7 | FIG. 29 | No exhaust path |
| First exhaust groove (Metal terminal) | | FIG. 23 | FIG. 23 | FIG. 23 | | FIG. 4(a) | | FIG. 4(a) | |
| Distance $D_1$ (mm) | | 0 | 0 | 0 | | 0 | | 0 | |
| Second exhaust groove (Securing member) | | | | | FIG. 6(e) | FIG. 6(e) | | | |

TABLE 2-continued

| | Ex. 9 | Ex. 10 | Ex. 11 | Ex. 12 | Ex. 13 | Ex. 14 | Ex. 15 | Ex. 16 | Com. Ex. 1 |
|---|---|---|---|---|---|---|---|---|---|
| Distance $D_2$ (mm) | | | | | 0 | 0 | | | |
| Third exhaust groove (Securing member) | | | | | | | FIG. 8(e) | FIG. 8(e) | |
| Distance $D_3$ (mm) | | | | | | | 0 | 0 | |
| First exhaust hole (Metal terminal) | FIG. 10(a) | | | | | | | | |
| Distance $D_4$ (mm) | 0 | | | | | | | | |
| Second exhaust hole (Securing member) | FIG. 17(a) | | | FIG. 17(a) | | | | | |
| Distance $D_5$ (mm) | 1.1 | | | 1.6 | | | | | |
| Metal Terminal | Flat plate | Projection | Projection | Projection | Flat plate | Flat plate | Flat plate | Flat plate | Flat plate |
| Distance $D_6$ (mm) | — | 1.1 | 1.1 | 1.1 | — | — | — | — | — |
| Cell removal determination | B1 | B2 | B2 | A | B2 | B2 | B3 | A | C |

In the above respective examples, the exhaust path was provided, and hence it was possible to appropriately remove the bubble generated in the first adhering surface and/or the second adhering surface. On the other hand, in Comparative Example 1, the exhaust path was not provided, and hence it was not possible to appropriately remove the bubble generated in each of the first adhering surface and the second adhering surface.

REFERENCE SIGNS LIST

1*a* to 1*j*: connection component
2*a* to 2*j*: connection structure
10: metal terminal
11: first main surface
12: second main surface
13: tab terminal
20: conductive member
21: conductive part
22: insulation part
30: securing member
31: first securing surface
32: second securing surface
40: exhaust path
40*a*: first exhaust groove
40*b*: second exhaust groove
40*c*: third exhaust groove
40*d*: first exhaust hole
40*e*: second exhaust hole
40*f*: bottomed hole
50: coupling member
60: projection
70: projecting portion
100: component to be connected
110: member to be connected
111: power feeding part.

The invention claimed is:

1. A connection component comprising:

a metal terminal;

a conductive member provided on one surface of the metal terminal and deformable by compression;

a securing member bonded to one surface of the metal terminal; and an exhaust path provided in at least one of the metal terminal and the securing member, the exhaust path being connected to or provided in at least one securing surface of: a first securing surface of the securing member that is bonded to the metal terminal; and a second securing surface that is an opposite surface to the first securing surface, the exhaust path exhausting a bubble generated in at least one of the first securing surface and the second securing surface.

2. The connection component according to claim 1, wherein the exhaust path comprises at least one of a first exhaust groove provided in a first main surface of the metal terminal that is bonded to the securing member, a second exhaust groove provided in the first securing surface, and a third exhaust groove provided in the second securing surface.

3. The connection component according to claim 2, wherein the first exhaust groove, the second exhaust groove and the third exhaust groove reach an edge of the securing member.

4. The connection component according to claim 1, wherein the metal terminal comprises a first main surface bonded to the securing member, and a second main surface that is an opposite surface to the first main surface, and the exhaust path comprises a first exhaust hole extending through the first main surface and the second main surface.

5. The connection component according to claim 4, wherein the first exhaust hole communicates with at least one of the first exhaust groove and the second exhaust groove.

6. The connection component according to claim 1, wherein the exhaust path comprises a second exhaust hole extending through the first securing surface and the second securing surface.

7. The connection component according to claim 6, wherein the second exhaust hole communicates with at least one of the first exhaust groove, the second exhaust groove, the third exhaust groove and the first exhaust hole.

8. The connection component according to claim 1, further comprising:

a coupling member coupling the conductive member and the securing member.

9. The connection component according to claim 8, wherein the second exhaust hole extends through the coupling member.

10. The connection component according to claim 1, wherein the exhaust path is a bottomed hole.

11. The connection component according to claim 1, wherein the exhaust path is disposed around the conductive member.

12. The connection component according to claim 1, wherein a shortest distance between the exhaust path and the conductive member is 15 mm or less.

13. The connection component according to claim 1, wherein the metal terminal comprises a first main surface bonded to the securing member, and a second main surface that is an opposite surface to the first main surface, and the second main surface comprises a projection.

14. The connection component according to claim 1, wherein the metal terminal comprises a first main surface bonded to the securing member, and the first main surface comprises a portion in contact with the conductive member, the portion being in a projecting shape.

15. The connection component according to claim 1, wherein the metal terminal comprises a tab terminal for cable connection.

16. The connection component according to claim 1, wherein the securing member comprises a pressure-sensitive adhesive layer or a pressure-sensitive adhesive double coated tape.

17. The connection component according to claim 1, wherein the conductive member comprises a rubber-like elastic body comprising a conductive filler.

18. A connection structure comprising:

a component to be connected;

a metal terminal;

a conductive member disposed between the metal terminal and the component to be connected, the metal terminal and the component to be connected having electrical continuity via the conductive member;

a securing member disposed between the metal terminal and the component to be connected, the securing member securing the metal terminal and the component to be connected, in a state where the conductive member comes into contact with both of the metal terminal and the component to be connected and is in a compressed state; and an exhaust path provided in at least one of the metal terminal and the securing member, the exhaust path being provided in or connected to at least one securing surface of a first securing surface of the securing member that is bonded to the metal terminal, and a second securing surface of the securing member that is bonded to the component to be connected, the exhaust path exhausting a bubble generated in at least one of the first securing surface and the second securing surface.

* * * * *